US012028897B2

(12) United States Patent
Noh et al.

(10) Patent No.: US 12,028,897 B2
(45) Date of Patent: *Jul. 2, 2024

(54) METHOD, DEVICE, AND SYSTEM FOR CHANNEL ACCESS IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

(*) Notice: Subject to any disclaimer, the term of this patent is extended or adjusted under 35 U.S.C. 154(b) by 370 days.

This patent is subject to a terminal disclaimer.

(21) Appl. No.: 17/315,188

(22) Filed: May 7, 2021

(65) Prior Publication Data

US 2021/0266963 A1 Aug. 26, 2021

Related U.S. Application Data

(63) Continuation of application No. 16/787,016, filed on Feb. 11, 2020, now Pat. No. 11,044,752, which is a
(Continued)

(30) Foreign Application Priority Data

Aug. 12, 2017 (KR) .................. 10-2017-0102681
Oct. 6, 2017 (KR) .................. 10-2017-0128598
(Continued)

(51) Int. Cl.
*H04W 74/08* (2024.01)
*H04L 5/00* (2006.01)
(Continued)

(52) U.S. Cl.
CPC ....... *H04W 74/0808* (2013.01); *H04L 5/0082* (2013.01); *H04W 74/006* (2013.01); *H04W 76/11* (2018.02)

(58) Field of Classification Search
CPC . H04W 74/0816; H04W 74/08; H04W 74/04; H04W 74/0006; H04W 74/0808;
(Continued)

(56) References Cited

U.S. PATENT DOCUMENTS 10,397,833 B2   8/2019  Lee et al.
10,757,717 B2   8/2020  Noh et al.
(Continued)

OTHER PUBLICATIONS

Office Action dated Nov. 11, 2021 for Korean Patent Application No. 10-2020-7005074 and its English translation provided by Applicant's foreign counsel.
(Continued)

*Primary Examiner* — Un C Cho
*Assistant Examiner* — Rasha K Fayed
(74) *Attorney, Agent, or Firm* — Ladas & Parry, LLP

(57) ABSTRACT

A user equipment of a wireless communication system is disclosed. The user equipment includes a communication module, and a processor. The processor is configured to perform a first type channel access, which is a channel access based on a random backoff, for an autonomous uplink (AUL) transmission when a predetermined condition is not satisfied, perform a second type channel access, in which channel sensing for a predetermined single time interval without backoff, for the AUL transmission when the predetermined condition is satisfied, and perform the AUL transmission based on a result of the first type channel access or a result of the second type channel access. The AUL transmission is performed by the user equipment without an uplink (UL) grant received from a base station.

20 Claims, 24 Drawing Sheets

Related U.S. Application Data continuation of application No. PCT/KR2018/009295, filed on Aug. 13, 2018.

(30) Foreign Application Priority Data

| Oct. 11, 2017 | (KR) | ......................... | 10-2017-0129706 |
| Apr. 6, 2018 | (KR) | ......................... | 10-2018-0040659 |

(51) Int. Cl.
| H04W 74/00 | (2009.01) |
| H04W 74/0808 | (2024.01) |
| H04W 76/11 | (2018.01) |

(58) Field of Classification Search
CPC ........... H04W 74/006; H04W 74/0833; H04W 74/02; H04W 72/02; H04W 72/23; H04W 72/1268; H04W 72/115; H04W 72/566; H04W 72/21; H04W 72/12; H04W 16/14; H04W 16/04; H04W 48/12; H04W 76/11; H04L 1/0026; H04L 1/1671; H04L 5/0082

See application file for complete search history.

(56) References Cited

U.S. PATENT DOCUMENTS

| 2013/0034069 | A1 | 2/2013 | Uemura | |
| 2015/0271089 | A1* | 9/2015 | Tang | ..................... H04W 72/21 370/229 |
| 2016/0095093 | A1* | 3/2016 | Yi | ........................... H04L 5/001 370/280 |
| 2017/0238338 | A1* | 8/2017 | Zhang | .................... H04W 72/23 370/329 |
| 2017/0366308 | A1* | 12/2017 | Choi | ..................... H04W 72/23 |
| 2018/0020484 | A1* | 1/2018 | Suzuki | .............. H04W 74/0833 |
| 2018/0035488 | A1* | 2/2018 | Yang | ..................... H04W 84/12 |
| 2019/0174543 | A1* | 6/2019 | Zhou | ................... H04W 74/006 |
| 2019/0208540 | A1 | 7/2019 | Kim et al. | |
| 2019/0349908 | A1* | 11/2019 | Talarico | ................. H04W 72/23 |
| 2019/0394798 | A1* | 12/2019 | Tomeba | ................. H04W 74/02 |
| 2020/0037359 | A1* | 1/2020 | Wang | ..................... H04L 1/1812 |
| 2020/0178286 | A1* | 6/2020 | Yu | .......................... H04L 5/0094 |
| 2020/0187251 | A1 | 6/2020 | Noh et al. | |
| 2020/0383038 | A1* | 12/2020 | Sugirtharaj | ........... H04W 48/16 |
| 2022/0014930 | A1* | 1/2022 | Zhou | ..................... H04L 5/0046 |

OTHER PUBLICATIONS

International Search Report for PCT/KR2018/009295 mailed on Nov. 29, 2018 and its English translation from WIPO (now published as WO2019/035624).

Written Opinion of the International Searching Authority for PCT/KR2018/009295 mailed on Nov. 29, 2018 and its English translation by Google Translate (now published as WO2019/035624).

International Preliminary Report on Patentability (Chapter I) for PCT/KR2018/009295 issued on Feb. 18, 2020 and its English translation from WIPO (published as WO2019/035624).

Nokia et al., "On Channel Access for Autonomous UL Access", R1-1713861, 3GPP TSG RAN WG1 Meeting #90, Prague, Czech Republic, Aug. 11, 2017 (See sections 1-5).

Nokia et al., "Autonomous Uplink Access", R2-1708483, 3GPP TSG RAN WG2 Meeting #99, Berlin, Germany, Aug. 11, 2017 (See section 3).

Ericsson, "On Autonomous UL Transmissions for NR in Unlicensed Spectrum", R1-1713985, 3GPP TSG RAN WG1 Meeting #90, Prague, Czech Republic, Aug. 10, 2017 (See sections 1-2).

Nokia et al., "HARQ for Autonomous Uplink Access", R1-1713860, 3GPP TSG RAN WG1 Meeting #90, Prague, Czech Republic, Aug. 11, 2017 (See sections 1-3).

Broadcom Limited et al., "Discussion on Multiple Starting and Ending Positions for UL in LAA", R1-1709058, 3GPP TSG RAN WG1 Meeting #89, Hangzhou, China, May 7, 2017 (See sections 1-3).

Notice of Allowance dated Apr. 1, 2021 for U.S. Appl. No. 16/787,016 (now published as 2020/0187251).

* cited by examiner

METHOD, DEVICE, AND SYSTEM FOR CHANNEL ACCESS IN UNLICENSED BAND

TECHNICAL FIELD

The present invention relates to a wireless communication system. Specifically, the present invention relates to a method, device, and system for transmitting physical channels in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

It is an object of the present invention to provide a method and device for efficiently transmitting a signal in a wireless communication system, in particular, a cellular wireless communication system. It is another object of the present invention to provide a method for efficiently transmitting a signal in a specific frequency band (e.g., unlicensed band) and a device therefor. In particular, it is an object of the present invention to provide a method for accessing a channel for performing autonomous transmission in a specific frequency band and a device therefor.

The technical object of the present invention is not limited to the above technical objects, and other technical problems that are not mentioned will be apparent to those skilled in the art from the following description.

Technical Solution

A terminal of a wireless communication system according to an embodiment of the present invention includes: a communication module; and a processor. The processor is configured to perform a first type channel access, which is a channel access based on a random backoff, for autonomous uplink (AUL) transmission when a predetermined condition is not satisfied, perform a second type channel access, in which channel sensing during a predetermined single time interval without a backoff is performed, for the AUL transmission when the predetermined condition is satisfied, and perform the AUL transmission based on a result of the first type channel access or a result of the second type channel access. The AUL transmission is performed by a terminal without an uplink (UL) grant received from a base station.

The predetermined condition may include that the resource for the AUL transmission in a carrier on which the AUL transmission is performed is included in a channel occupancy time (COT) obtained by the base station.

The predetermined condition may include that as the resource for the AUL transmission is included in a UL interval indicated by the base station using a UL offset and a UL duration in the carrier on which the AUL transmission is performed, the resource for the AUL transmission is included in the COT obtained by the base station.

When the terminal performs scheduled Uplink (SUL) transmission in a UL interval indicated by the base station using a UL offset and a UL duration, the processor may be configured to perform a UL transmission based on the UL grant using a second type channel access. The SUL transmission may be performed by the terminal according to a scheduling indicated by the UL grant received from the base station.

The processor may be configured to determine whether a resource for the AUL transmission is included in a COT obtained by the base station in a carrier on which the AUL transmission is performed, based on a group common Physical Downlink Control Channel (PDCCH). The group common PDCCH may be scrambled with a group common Radio Network Temporary Identity (RNTI) for transmitting UL scheduling information or downlink (DL) scheduling information to one or more terminals.

When the terminal performs the AUL transmission using the first type channel access before the n-th subframe in any one carrier, the processor may be configured to perform scheduled UL (SUL) transmission in the n-th subframe of the any one carrier without a Listen Before Talk (LBT) procedure. The SUL transmission may be a UL transmission performed by the terminal according to a scheduling indicated by the UL grant received from the base station. In this case, the processor may perform the SUL transmission subsequent to the AUL transmission.

The processor may be configured to perform the SUL transmission without the LBT procedure based on whether the resource for the SUL transmission is included in a channel occupancy time (COT) obtained by the terminal for AUL transmission.

An initial value of a backoff counter in the first type channel access may be determined based on a value of a priority class used in the first type channel access. When the terminal performs a scheduled uplink (SUL) transmission using the first type channel access, the processor may be configured to obtain the initial value of the backoff counter based on a priority class indicated by the base station. In addition, when the terminal performs the first type channel access for the AUL transmission, the processor may be configured to obtain the initial value of the backoff counter based on the highest priority value among values of the priority class. The SUL transmission may be performed by the terminal according to a scheduling indicated by the UL grant received from the base station.

The processor may be configured to activate or deactivate the AUL transmission based on a Radio Network Temporary Identity (RNTI) indicated to configure a resource for AUL transmission.

When the resource for the AUL transmission and the resource for the scheduled uplink (SUL) transmission overlap, the processor may be configured to perform the UL grant based transmission on the corresponding resource. The SUL transmission may be performed by the terminal according to a scheduling indicated by the UL grant received from the base station.

An operation method of a terminal of a wireless communication system according to an embodiment of the present invention includes: performing a first type channel access, which is a channel access based on a random backoff, for autonomous uplink (AUL) transmission when a predetermined condition is not satisfied, performing a second type channel access, in which channel sensing for a predetermined single time interval without a backoff is performed, for the AUL transmission when the predetermined condition is satisfied, and performing the AUL transmission based on a result of the first type channel access or a result of the second type channel access. The AUL transmission is performed by the terminal without an uplink (UL) grant received from a base station.

The predetermined condition may include that the resource for the AUL transmission is included in a channel occupancy time (COT) obtained by the base station in a carrier on which the AUL transmission is performed.

The predetermined condition may include that as the resource for the AUL transmission is included in a UL interval indicated by the base station using a UL offset and a UL duration in the carrier on which the AUL transmission is performed, the resource for the AUL transmission is included in the COT obtained by the base station.

The operation method may further include, when the terminal performs scheduled Uplink (SUL) transmission in a UL interval indicated by the base station using a UL offset and a UL duration, performing, by the processor, a UL transmission based on the UL grant using the second type channel access. The SUL transmission may be performed by the terminal according to a scheduling indicated by the UL grant received from the base station.

The performing of the second type channel access when the predetermined condition is satisfied may include determining, by the processor, whether a resource for the AUL transmission is included in a COT obtained by the base station in a carrier on which the AUL transmission is performed, based on a group common Physical Downlink Control Channel (PDCCH). The group common PDCCH may be scrambled with a group common Radio Network Temporary Identity (RNTI) to transmit UL scheduling information or downlink (DL) scheduling information to one or more terminals.

The operation method may further include, when the terminal performs the AUL transmission using the first type channel access before the n-th subframe in any one carrier, performing, by the processor, scheduled UL (SUL) transmission in the n-th subframe of the any one carrier without a Listen Before Talk (LBT) procedure. The SUL transmission may be performed by the terminal according to the scheduling indicated by the UL grant received from the base station.

The performing of the SUL transmission may include performing the SUL transmission subsequent to the AUL transmission.

The performing of the SUL transmission may include performing the SUL transmission without the LBT procedure based on whether the resource for the UL grant based transmission is included in a channel occupancy time (COT) obtained by the terminal for AUL transmission.

An initial value of a backoff counter in the first type channel access may be determined based on a value of a priority class used in the first type channel access. In this case, the operation method may further include, when the terminal performs a scheduled uplink (SUL) transmission using the first type channel access, obtaining, by the terminal, the initial value of the backoff counter based on a priority class designated by the base station. The performing of the first type channel access may include, when the terminal performs the first type channel access for the AUL transmission, obtaining, by the processor, the initial value of the backoff counter based on the highest priority value among values of the priority class. The SUL transmission may be performed by the terminal according to a scheduling indicated by the UL grant received from the base station.

Advantageous Effects

A wireless communication system according to an embodiment of the present invention, in particular, a cellular wireless communication system provides a method and device for efficiently transmitting signals. In addition, a wireless communication system according to an embodiment of the present invention provides a method for efficiently transmitting a signal in a specific frequency band (e.g., unlicensed band) and a device therefor. In addition, the wireless communication system according to an embodiment of the present invention provides a method for autonomous access to a channel in a specific frequency band (e.g., unlicensed band) and a device therefor.

Effects obtainable from various embodiments of the present disclosure are not limited to the above-mentioned effects, and other effects not mentioned above may be clearly derived and understood to those skilled in the art from the following description.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

This application claims priority to and the benefit of Korean Patent Application Nos. 10-2017-0102681 (2017.08.12), Nos. 10-2017-0128598 (2017.10.06), Nos. 10-2017-0129706 (2017.10.11), and Nos. 10-2018-0040659 (2018.04.06) filed in the Korean Intellectual Property Office and the embodiments and mentioned items described in the respective applications are included in the Detailed Description of the present application.

Figure 1:
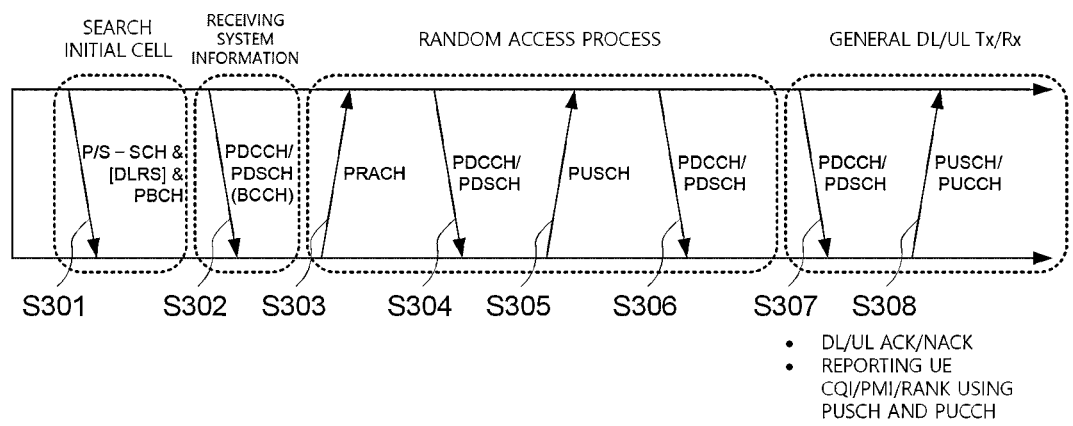
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control channel and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S101). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S102).

When there is no radio resource for initially accessing the base station or signal transmission, the user equipment may perform a random access procedure (RACH procedure) to the base station (S103 to S106). Firstly, the user equipment may transmit a preamble through a physical random access channel (PRACH) (S103) and receive a response message to the preamble through the PDCCH and the PDSCH corresponding thereto (S104). When the user equipment receive a valid response message to random access, the user equipment may transmit data including an identifier of the user equipment to the base station by using the uplink (UL) grant (S105). To resolve a contention resolution, the user equipment may wait for receiving PDCCH as instruction of the base station. When the user equipment receive PDCCH by using the identifier of the user equipment (S016), random access procedure may end.

Thereafter, the user equipment may receive the PDCCH/PDSCH (S107) and transmit a physical uplink shared channel (PUSCH)/physical uplink control channel (PUCCH) (S108) as a general procedure. The user equipment receives downlink control information (DCI) through the control channel (PDCCH or E-PDCCH). The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
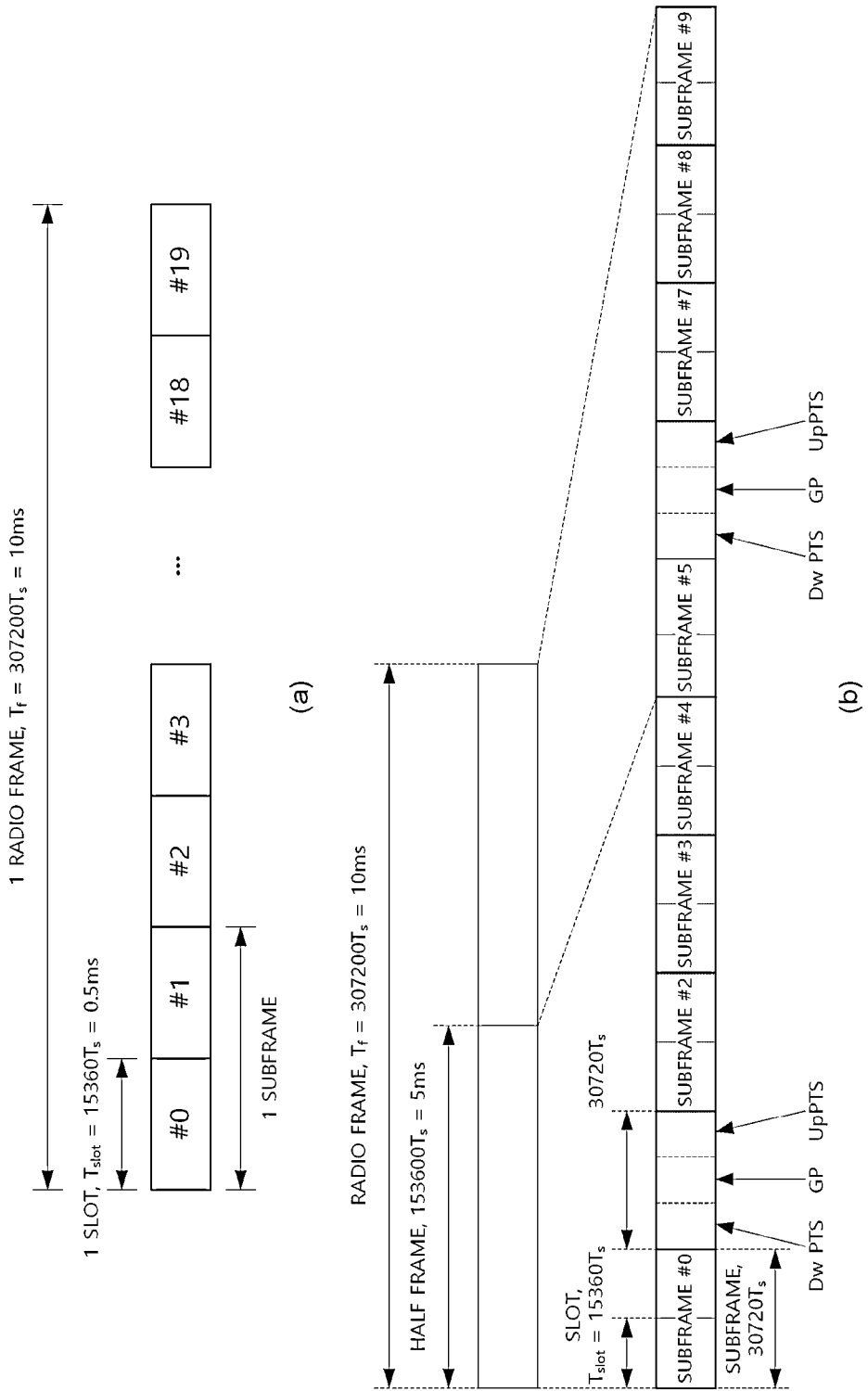
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. 20 slots in one radio frame may be sequentially numbered from 0 to 19. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band. The TDD radio frame further includes special subframes for downlink and uplink switching. The special subframe includes a Downlink Pilot Time Slot (DwPTS), a guard period (GP), and an Uplink Pilot Time Slot (UpPTS).

Figure 3:
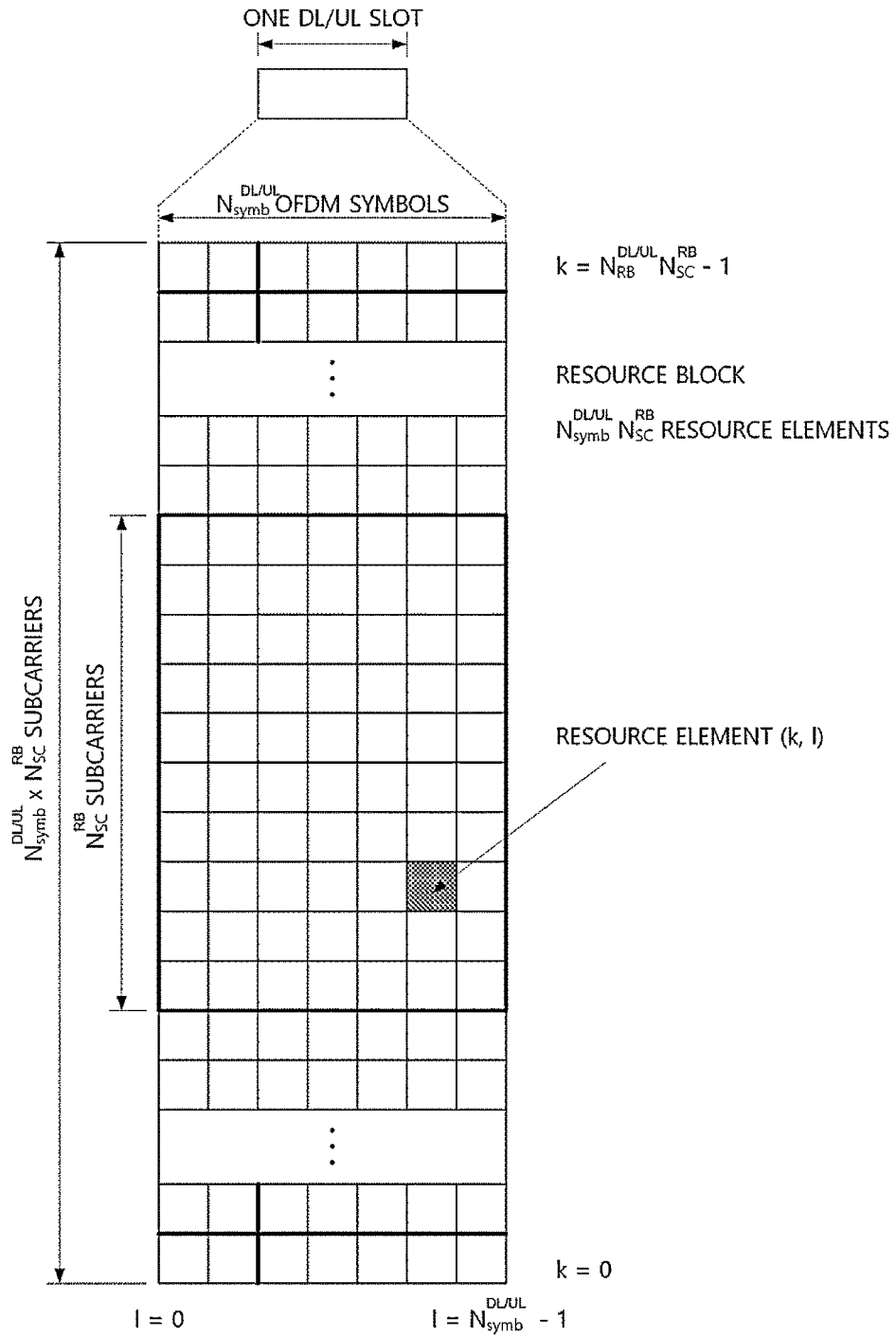
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb}*N^{RB}_{sc}$ resource elements.

The resource of the slot may be expressed as a resource grid constituted by $N^{DL/UL}_{RB}*N^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB}*N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
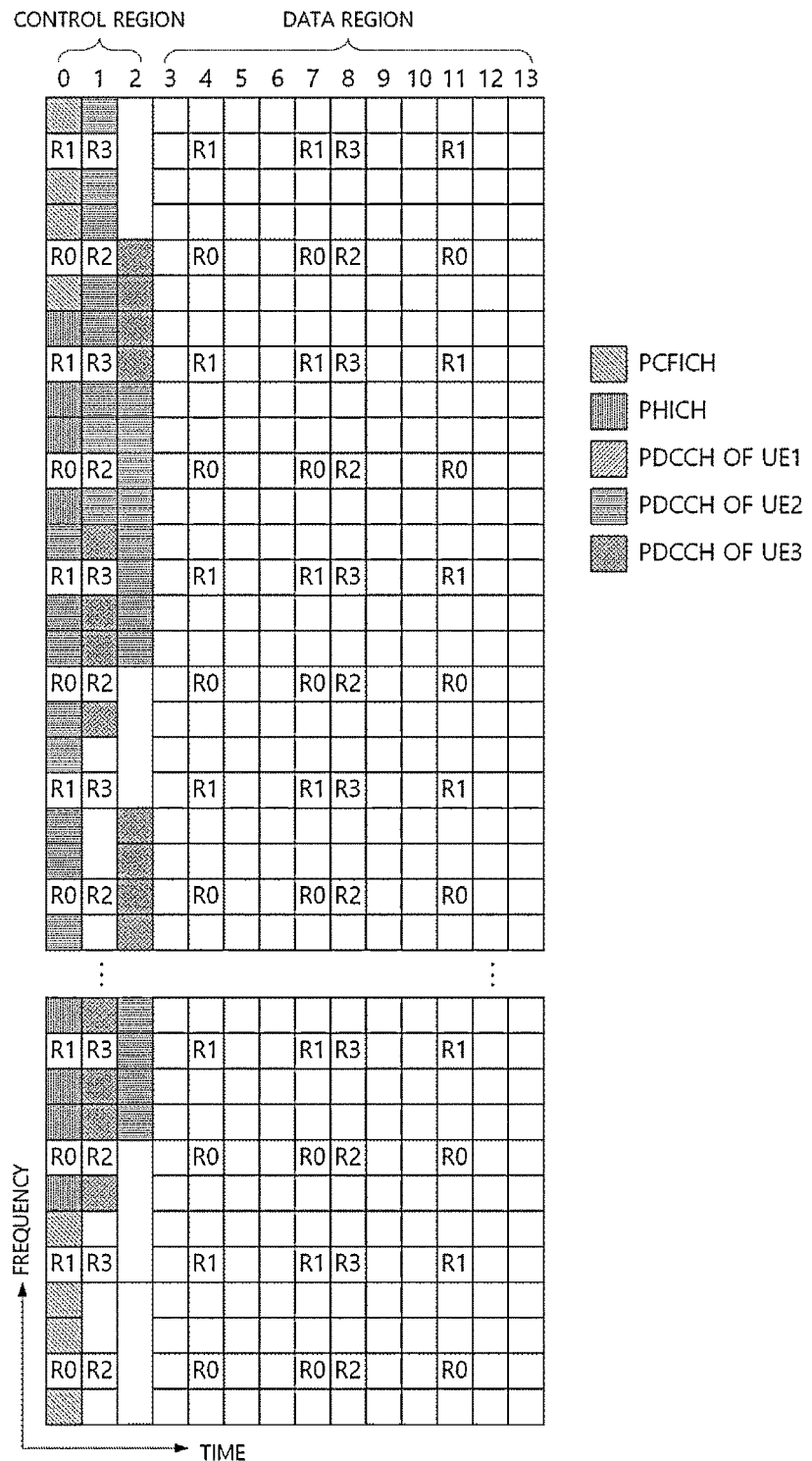
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell senses the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
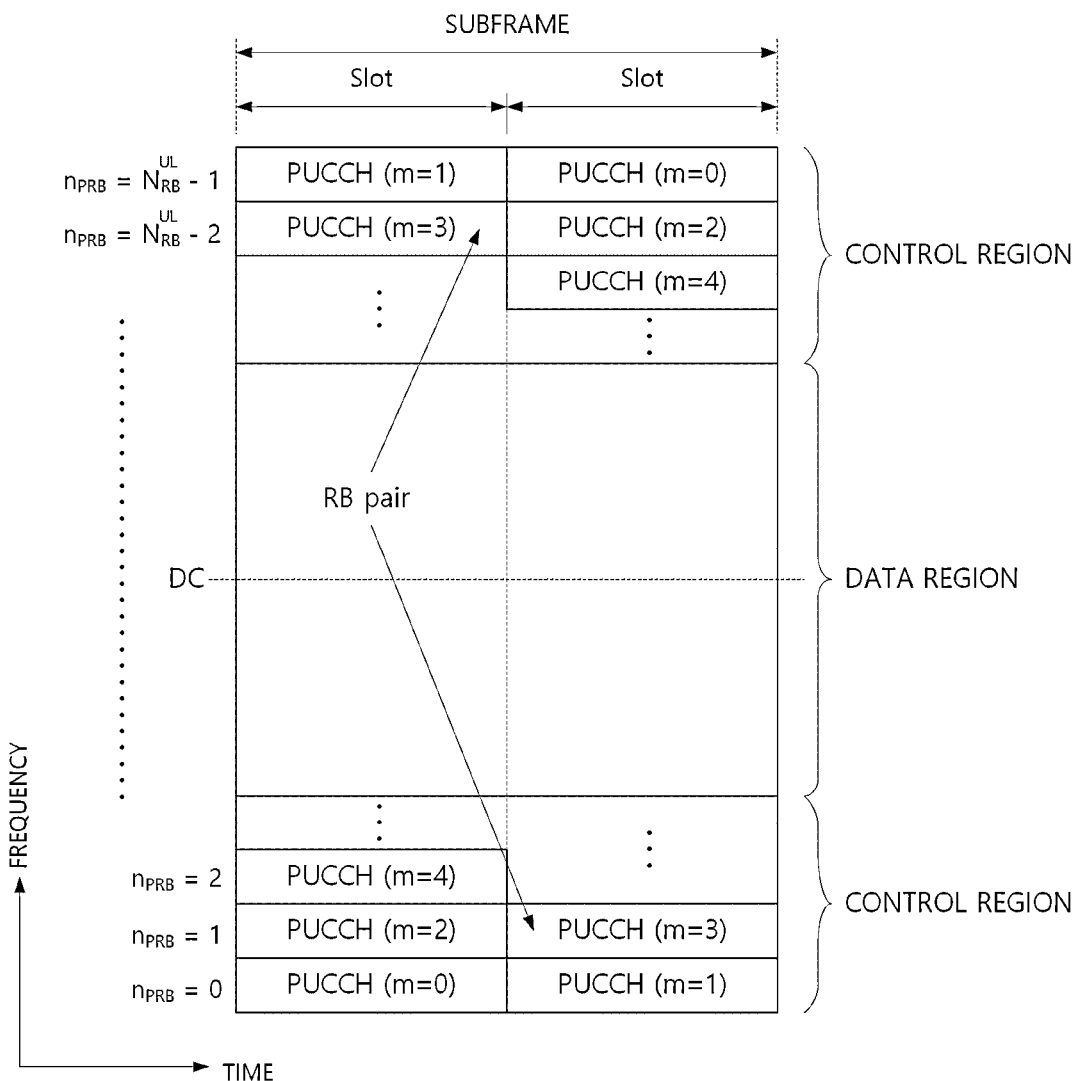
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
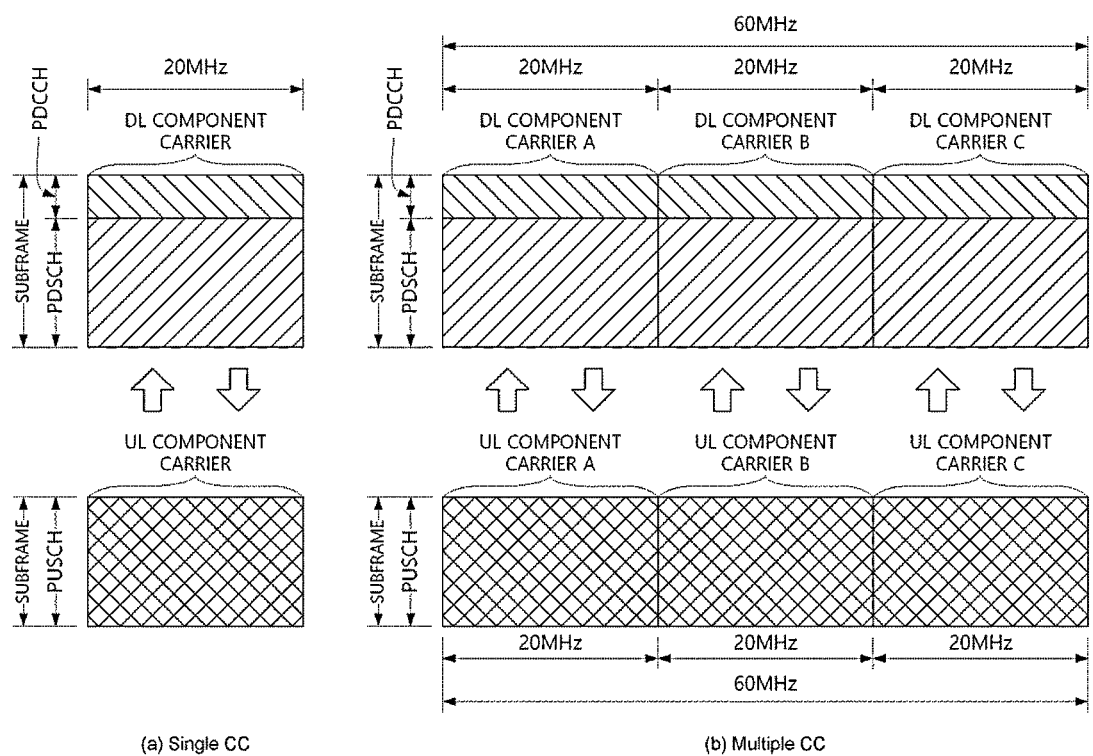
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
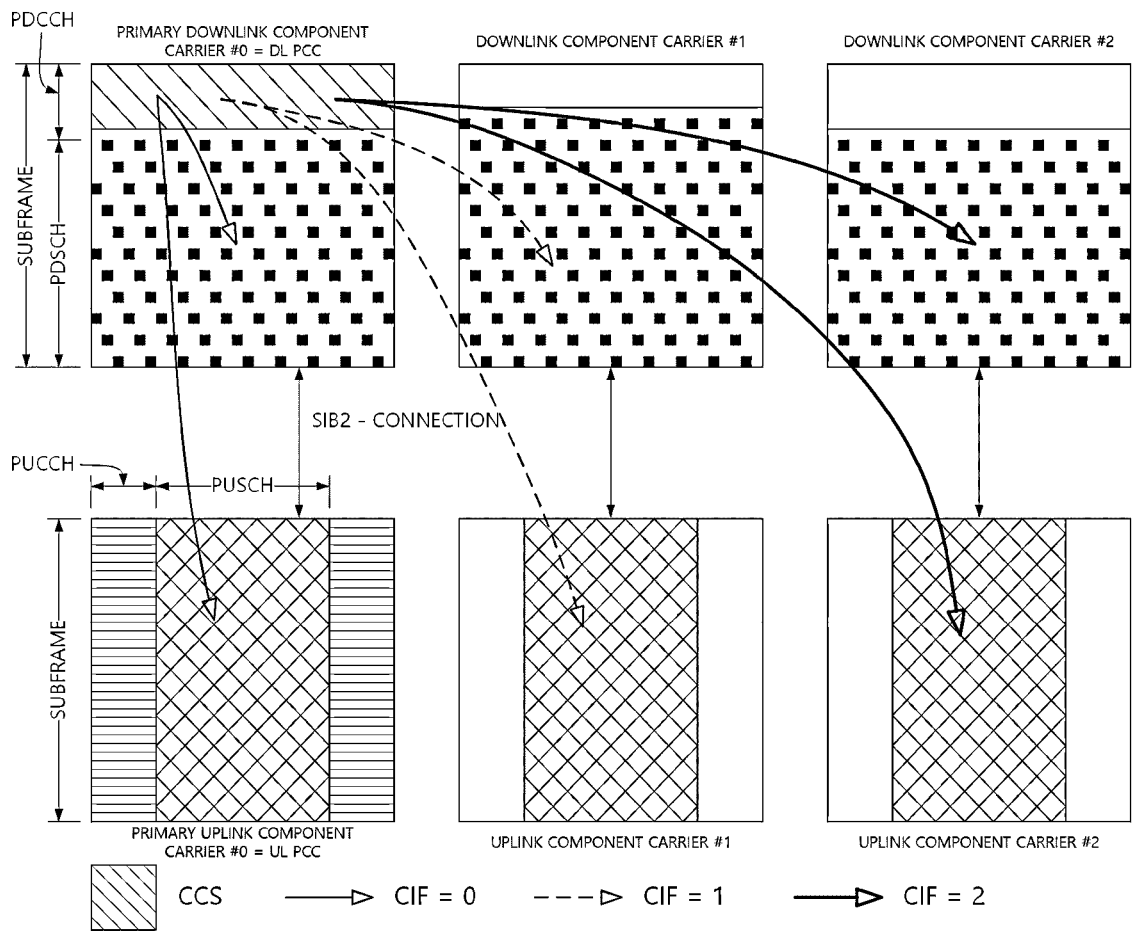
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an higher layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) higher layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
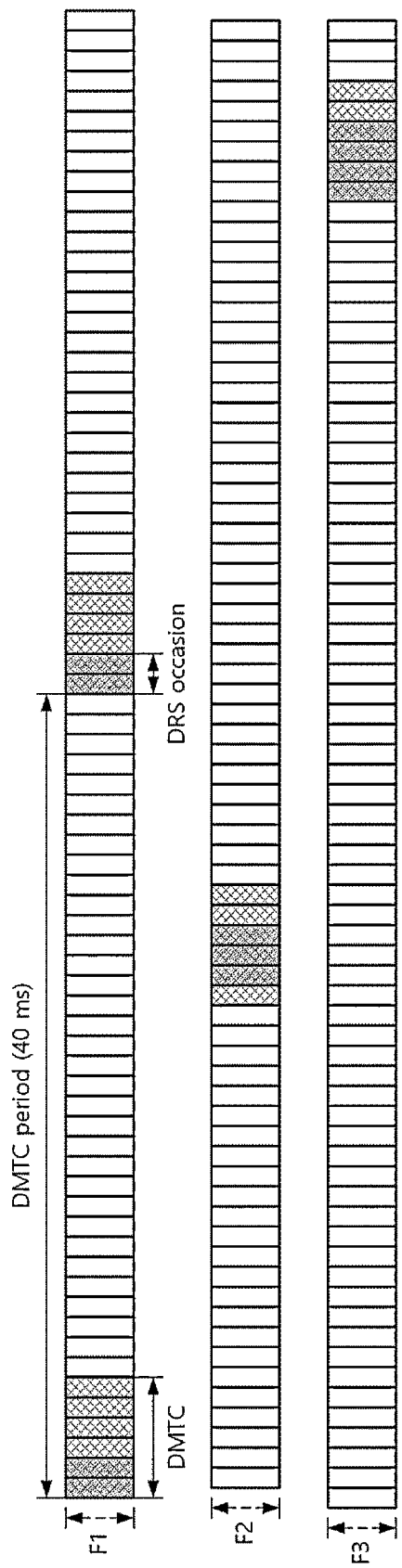
FIG. 8 illustrates Discovery Reference Signal (DRS) transmission.
Figure 9:
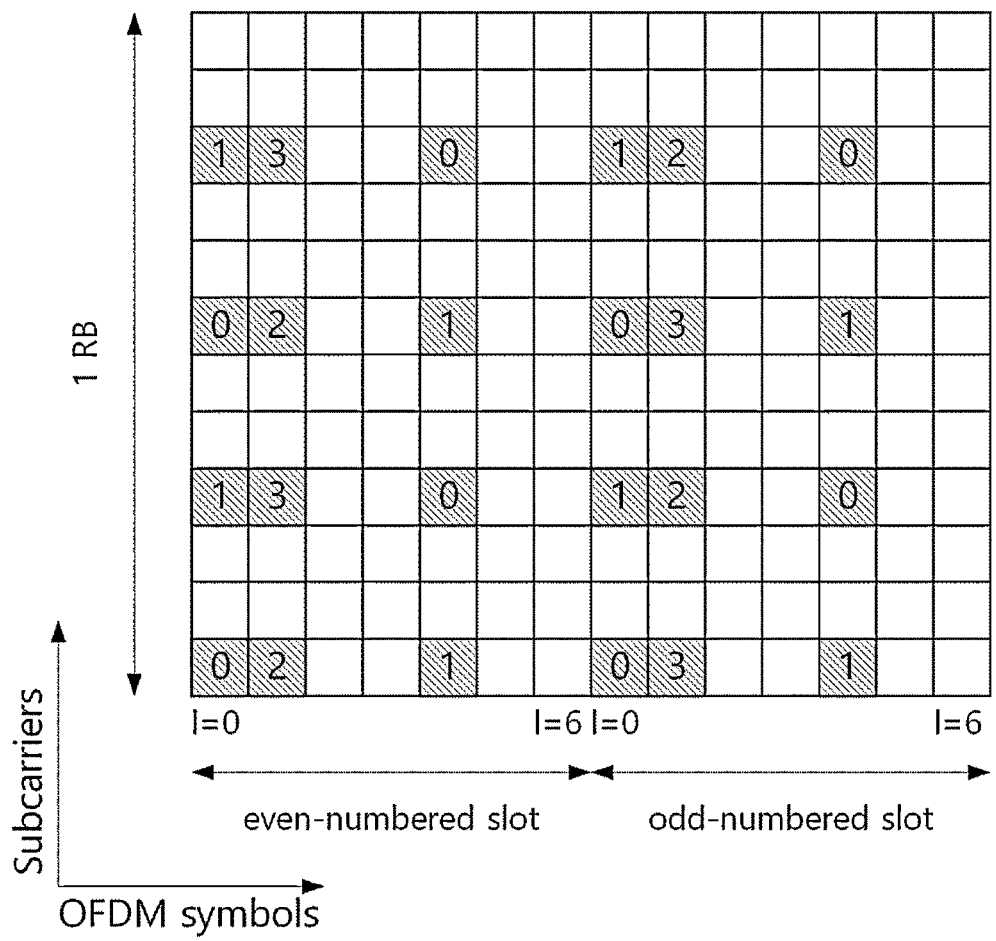
FIGS. 9 to 11 illustrate the structure of a reference signal used as DRS.
Figure 10:
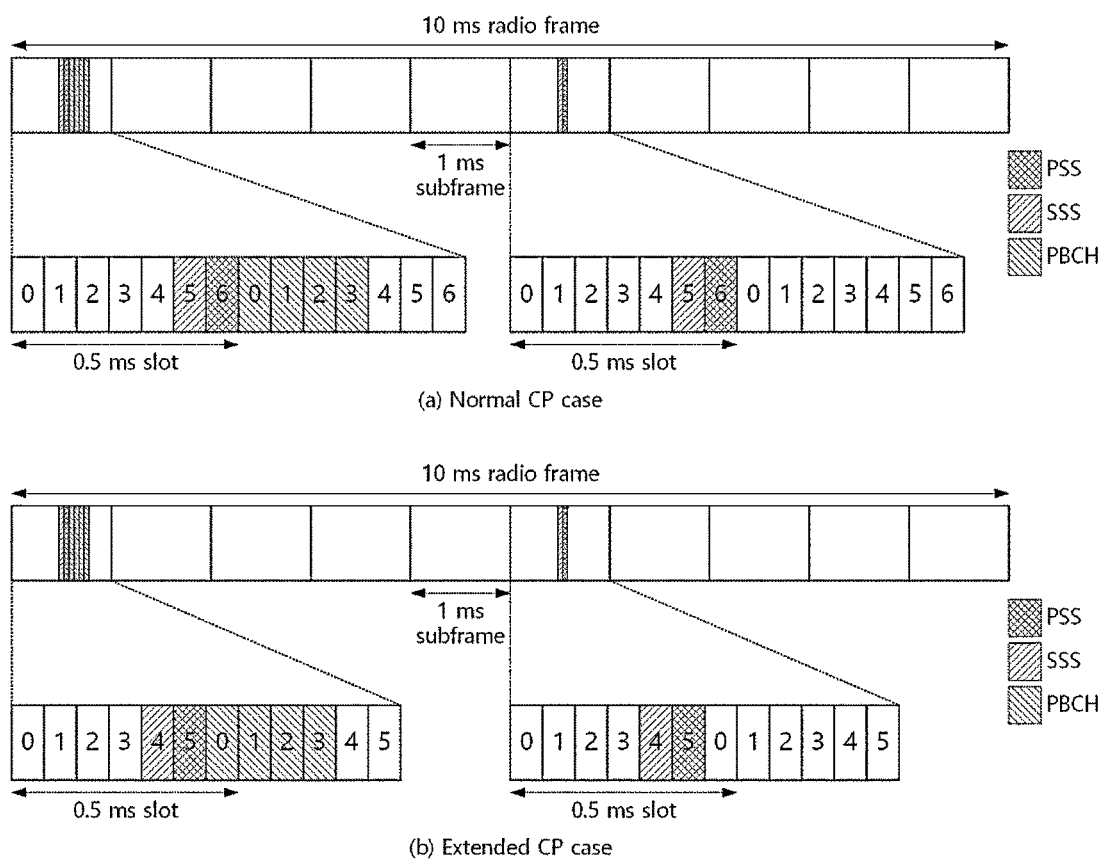
Figure 11:
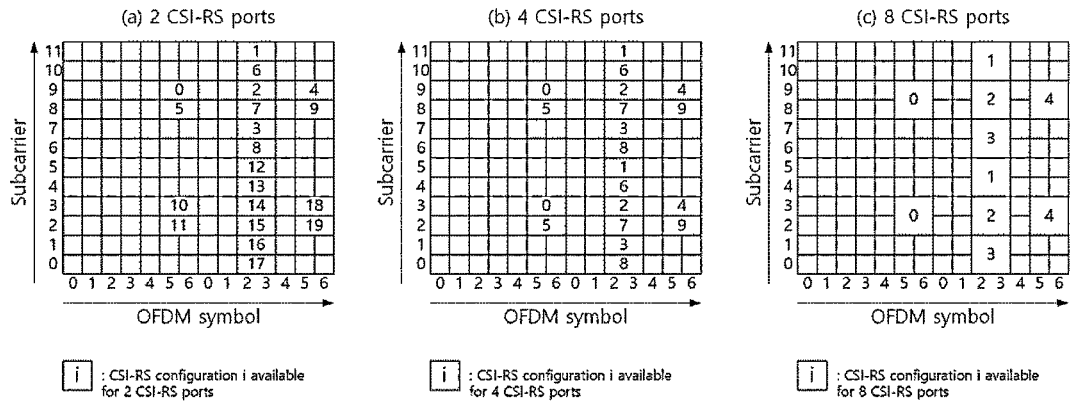

Hereinafter, DRS transmission in a licensed band will be described with reference to FIGS. 8 to 11. FIG. 8 illustrates DRS transmission, and FIGS. 9 to 11 illustrate a structure of a reference signal used in DRS. For convenience, DRS in the licensed band is referred to as Rel-12 DRS. DRS supports small cell on/off, and a SCell that is not active for any user equipment may be turned off except for DRS periodic transmission. Also, based on the DRS, a user equipment may obtain cell identification information, measure Radio Resource Management (RRM), and obtain downlink synchronization.

Referring to FIG. 8, a Discovery Measurement Timing Configuration (DMTC) indicates a time window in which a user equipment expects to receive DRS. The DMTC is fixed at 6 ms. The DMTC period is the transmission period of the DMTC, and may be 40 ms, 80 ms, or 160 ms. The position of the DMTC is specified by the DMTC transmission period and the DMTC offset (in units of subframes), and these information are transmitted to the user equipment through higher layer signaling (e.g., RRC signaling). DRS transmissions occur at the DRS occasion within the DMTC. The DRS occasion has a transmission period of 40 ms, 80 ms or 160 ms, and the user equipment may assume that there is one DRS occasion per DMTC period. The DRS occasion includes 1 to 5 consecutive subframes in the FDD radio frame and 2 to 5 consecutive subframes in the TDD radio frame. The length of the DRS occasion is delivered to the user equipment via higher layer signaling (e.g., RRC signaling). The user equipment may assume DRS in the DL subframe in the DRS occasion. DRS occasion may exist anywhere in the DMTC, but the user equipment expects the transmission interval of DRSs transmitted from the cell to be fixed (i.e., 40 ms, 80 ms, or 160 ms). That is, the position of the DRS occasion in the DMTC is fixed per cell. The DRS is configured as follows:

Cell-specific Reference Signal (CRS) at antenna port 0 (see FIG. 9): It exists in all downlink subframes within the DRS occasion, and in the DwPTS of all the special subframes. The CRS is transmitted in the entire band of the subframe.

Primary Synchronization Signal (PSS) (see FIG. 10): In the case of FDD radio frame, it exists in the first subframe in DRS occasion, or in the second subframe in DRS occasion in the case of TDD radio frame. The PSS is transmitted in the seventh (or sixth) OFMDA symbol of the subframe and mapped to six RBs (=72 subcarriers) close to the center frequency.

Secondary Synchronization Signal (SSS) (see FIG. 10): It exists in the first subframe in the DRS occasion. The SSS is transmitted in the sixth (or fifth) OFMDA symbol of the subframe and mapped to six RBs (=72 subcarriers) close to the center frequency.

non-zero-power Channel State Information (CSI)-RS (see FIG. 11): It exists in zero or more subframes in the DRS occasion. The position of the non-zero-power CSI-RS is variously configured according to the number of CSI-RS ports and the higher layer configuration information.

FIG. 8 illustrates a case where the DRS reception time is set to a separate DMTC for each frequency in a user equipment's situation. Referring to FIG. 8, in the case of frequency F1, a DRS occasion with a length of 2 ms is transmitted every 40 ms, in the case of frequency F2, a DRS occasion with a length of 3 ms is transmitted every 80 ms, and in the case of frequency F3, a DRS occasion with a length of 4 ms is transmitted every 80 ms. The user equipment may know the starting position of the DRS occasion in the DMTC from the subframe including the SSS. Here, the frequencies F1 to F3 may be replaced with corresponding cells, respectively.

Embodiment: DRS Transmission Scheme in Unlicensed Band

Figure 12:
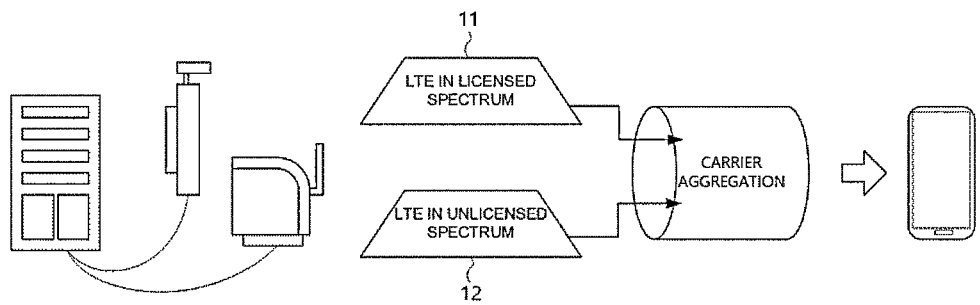
FIG. 12 illustrates a Licensed Assisted Access (LAA) service environment.

FIG. 12 illustrates a Licensed Assisted Access (LAA) service environment. Referring to FIG. 12, a service environment in which LTE technology 11 in the existing licensed band and LTE-Unlicensed (LTE-U), i.e., LTE technology 12 in the unlicensed band currently being actively discussed, or LAA are incorporated may be provided to a user.

Figure 13:
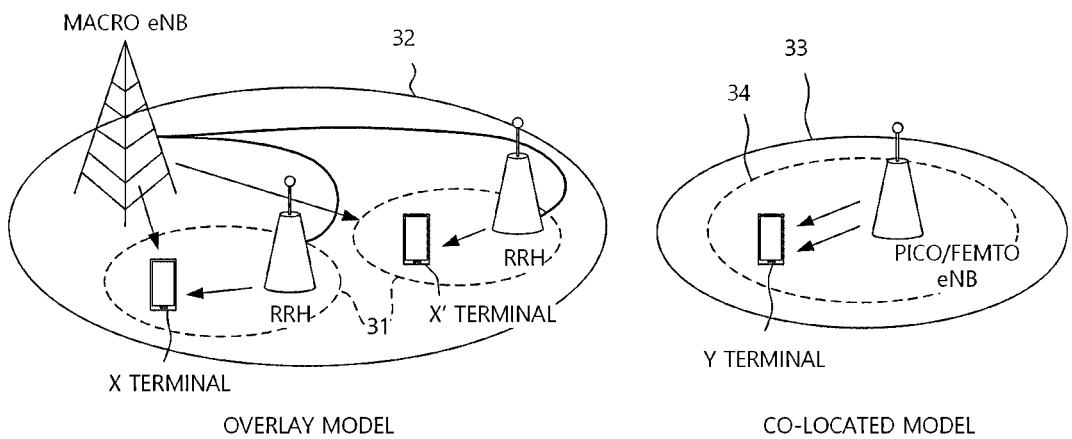
FIG. 13 illustrates a deployment scenario of a user equipment and a base station in an LAA service environment.

FIG. 13 illustrates a deployment scenario of a user equipment and a base station in an LAA service environment.

A frequency band targeted by the LAA service environment has short radio communication range due to the high frequency characteristics. Considering this, the deployment scenario of the user equipment and the base station may be an overlay model or a co-located model in an environment in which coexist the existing LTE-L service and LAA service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LAA message or data. Therefore, conventional equipments determine the LAA message or data as a kind of energy to perform an interference avoidance operation by an energy detection technique. That is, when energy corresponding to the LAA message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LAA technology/service. However, since peripheral equipments which perform communication through the unlicensed band attempt access based on the energy detection technique, there is a problem in that an efficient LAA service is difficult. Therefore, a research into a coexistence scheme with the conventional unlicensed band device and a scheme for efficiently sharing a radio channel needs to be preferentially made in order to settle the LAA technology. That is, a robust coexistence mechanism in which the LAA device does not influence the conventional unlicensed band device needs to be developed.

Figure 14:
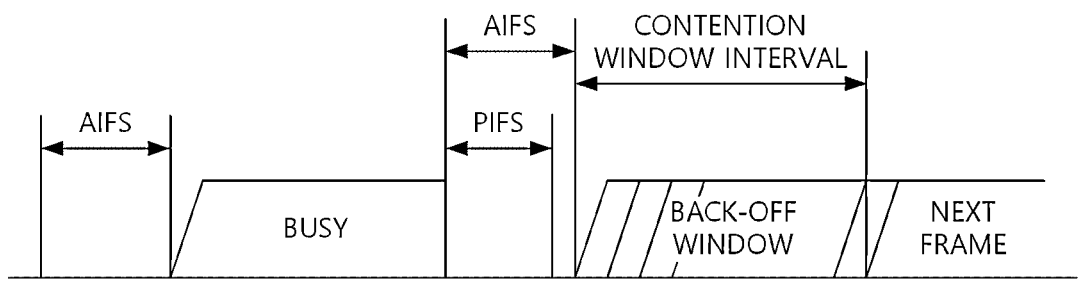
FIG. 14 illustrates a conventional communication scheme operating in an unlicensed band.

FIG. 14 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 14, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration means a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1: No LBT
  An LBT procedure by a Tx entity is not performed.
Category 2: LBT without random backoff
  A time interval in which the channel needs to be sensed in an idle state before the Tx entity performs a transmission on the channel is decided. The random backoff is not performed.
Category 3: LBT with random backoff with a CW of fixed size
  LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
Category 4: LBT with random backoff with a CW of variable size
  LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel.

Figure 15:
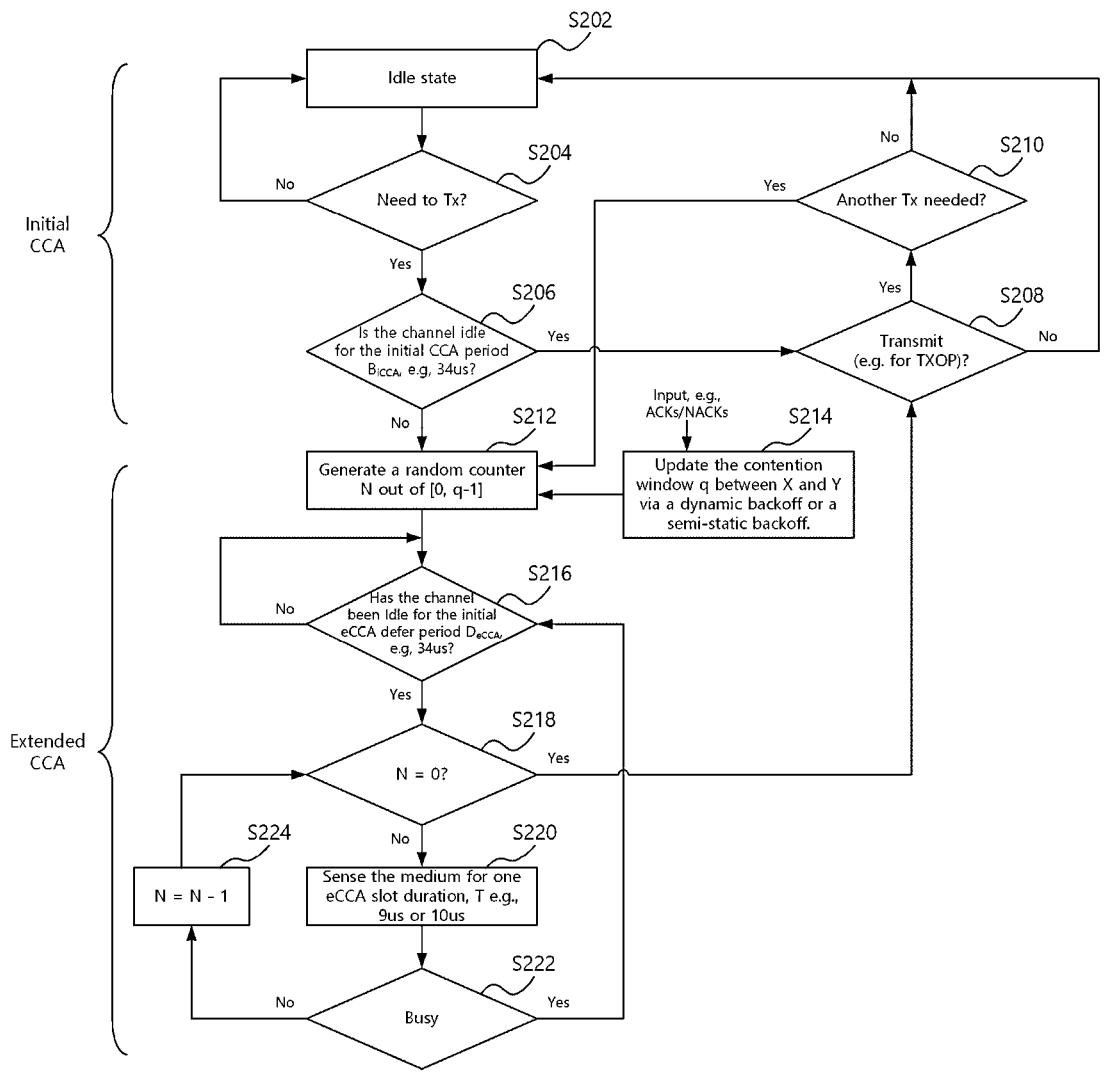
FIGS. 15 and 16 illustrate a Listen-Before-Talk (LBT) procedure for DL transmission.
Figure 16:
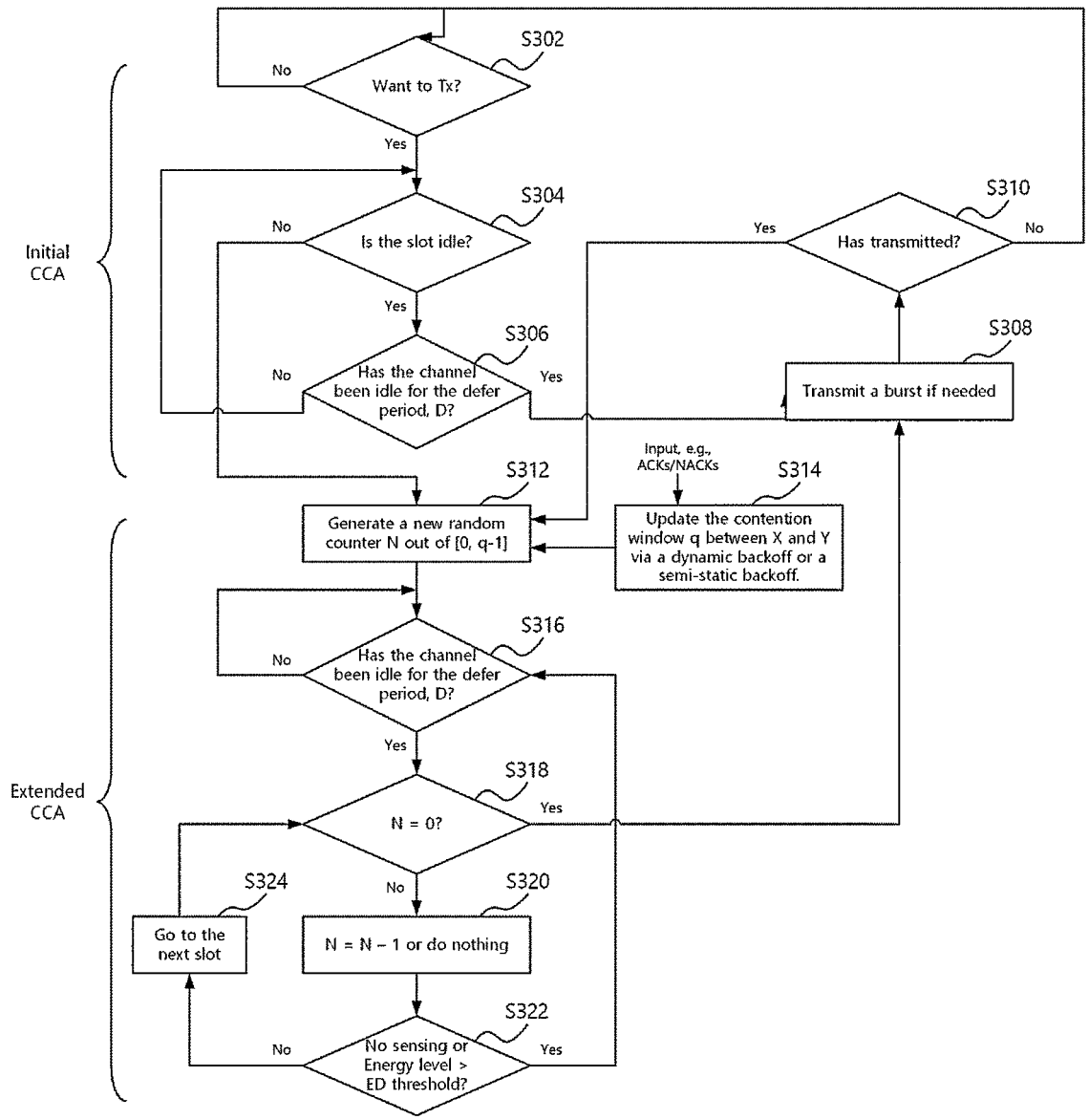

FIGS. 15 and 16 illustrate a DL transmission process based on a category 4 LBT. The category 4 LBT may be used to ensure fair channel access with Wi-Fi. Referring to FIGS. 15 and 16, the LBT process includes Initial CCA (ICCA) and Extended CCA (ECCA). That is, it is determined whether the channel is idle through the ICCA, and data transmission is performed after the ICCA period. If the interference signal is detected and data transmission fails, a data transmission time point may be obtained through a defer duration+backoff counter after setting a random backoff counter.

Referring to FIG. 15, the signal transmission process may be performed as follows.

Initial CCA
  S202: The base station verifies that the channel is idle.
  S204: The base station verifies whether the signal transmission is required. When the signal transmission is not required, the process returns to S202 and when the signal transmission is required, the process proceeds to S206.

S206: The base station verifies whether the channel is idle for an ICCA defer duration ($B_{CCA}$). The ICCA defer duration is configurable. As an implementation example, the ICCA defer duration may be constituted by an interval of 16 µs and n consecutive CCA slots. Herein, n may be a positive integer and one CCA slot duration may be 9 µs. The number of CCA slots may be configured differently according to a QoS class. The ICCA defer duration may be set to an appropriate value by considering a defer duration (e.g., DIFS or AIFS) of Wi-Fi. For example, the ICCA defer duration may be 34 us. When the channel is idle for the ICCA defer duration, the base station may perform the signal transmitting process (S208). When it is determined that the channel is busy during the ICCA defer duration, the process proceeds to S212 (ECCA).

S208: The base station may perform the signal transmitting process. When the signal transmission is not performed, the process proceeds to S202 (ICCA) and when the signal transmission is performed, the process proceeds to S210. Even in the case where a backoff counter N reaches 0 in S218 and S208 is performed, when the signal transmission is not performed, the process proceeds to S202 (ICCA) and when the signal transmission is performed, the process proceeds to S210.

S210: When additional signal transmission is not required, the process proceeds to S202 (ICCA) and when the additional signal transmission is required, the process proceeds to S212 (ECCA).

Extended CCA

S212: The base station generates the random number N in the CW. N is used as a counter during the backoff process and generated from [0, q−1]. The CW may be constituted by q ECCA slots and an ECCA slot size may be 9 µs or 10 µs. The CW size (CWS) may be defined as q and be variable in S214. Thereafter, the base station proceeds to S216.

S214: The base station may update CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the terminal's feedback/report (e.g., HARQ ACK/NACK) or updated/adjusted based on the base station sensing.

S216: The base station determines that the channel is idle during the ECCA defer duration (DeCCA). The ECCA defer duration is configurable. As an embodiment, the ECCA defer duration may be composed of a 16 µs interval and n consecutive CCA slots. Herein, n is a positive integer and one CCA slot duration may be 9 µs. The number of CCA slots may be set differently according to the QoS class. The ECCA defer duration may be set to an appropriate value by considering the defer duration of Wi-Fi (e.g., DIFS and AIFS). For example, the ECCA defer duration may be 34 us. If the channel is idle during the ECCA defer duration, the base station proceeds to S218. If the channel is determined to be busy during the ECCA defer duration, the base station repeats S216.

S218: The base station checks if N is 0. If N is 0, the base station may perform a signal transmission process (S208). In this case (i.e., N=0), the base station may continue the ECCA procedure by performing CCA checking during at least one slot without performing the transmission immediately. If N is not 0 (i.e., N>0), the process proceeds to S220.

S220: The base station senses the channel for one ECCA slot duration T. The ECCA slot size may be 9 µs or 10 µs, and the actual sensing time may be at least 4 µs.

S222: If it is determined that the channel is idle, the process proceeds to S224. If it is determined that the channel is busy, the process returns to S216. That is, one ECCA defer duration is reapplied after the channel is idle, and N does not count down during the ECCA defer duration.

S224: Decrement N by 1 (ECCA countdown).

FIG. 16 is substantially the same as/similar to the transmission process of FIG. 15 and differs according to the implementation method. Therefore, the details may refer to the contents of FIG. 15.

Initial CCA

S302: The base station checks whether signal transmission is needed. If no signal transmission is required, S302 is repeated, and if signal transmission is required, the process proceeds to S304.

S304: The base station checks if the slot is idle. If the slot is idle, the process proceeds to S306. If the slot is busy, the process proceeds to S312 (ECCA). The slot may correspond to the CCA slot in FIG. 15.

S306: The base station checks that the channel is idle during the defer duration D. D may correspond to the ICCA defer duration in FIG. 15. If the channel is idle during the defer duration, the base station may perform the signal transmission process (S308). If it is determined that the channel is busy during the defer duration, the process proceeds to S304.

S308: The base station may perform the signal transmission process if necessary.

S310: If there is no signal transmission, the process proceeds to S302 (ICCA), and if there is a signal transmission, the process proceeds to S312 (ECCA). Even through the back-off counter N reaches 0 in S318 and S308 is performed, if there is no signal transmission, the process proceeds to S302 (ICCA) and if there is signal transmission, the process proceeds to S312 (ECCA).

Extended CCA

S312: The base station generates a random number N in the CW. N is used as a counter in the back-off process and is generated from [0, q−1]. The CW size CWS is defined by q and may be varied in S314. Thereafter, the base station proceeds to S316.

S314: The base station may update the CWS. CWS q may be updated to a value between X and Y. The X and Y values are configurable parameters. The CWS update/adjustment may be performed each time N is generated (dynamic back-off) or semi-static (semi-static back-off) at certain time intervals. The CWS may be updated/adjusted based on exponential back-off or binary back-off. That is, the CWS may be updated/adjusted to a power of 2 or a multiple of 2. With respect to the PDSCH transmission, the CWS may be updated/adjusted based on the user equipment's feedback/report (e.g., HARQ ACK/NACK) or updated/adjusted based on the base station sensing.

S316: The base station checks that the channel is idle during the defer duration D. D may correspond to the ECCA defer duration in FIG. 15. D in S306 and S316 may be the same. If the channel is idle during the defer duration, the base station proceeds to S318. If the channel is determined to be busy during the defer duration, the base station repeats S316.

S318: The base station checks if N is 0. If N is 0, the base station may perform a signal transmission process (S308). In this case (N=0), the base station may continue the ECCA procedure by performing CCA checking during at least one slot without performing the transmission immediately. If N is not 0 (i.e., N>0), the process proceeds to S320.

S320: The base station selects one of an operation of decrementing N by 1 (ECCA countdown) and an operation of not decrementing N (self-deferral). The self-deferral operation may be performed according to the implementation/selection of the base station. At the self-deferral time, the base station does not perform sensing for energy detection and does not perform ECCA countdown.

S322: The base station may select one of an operation not to perform sensing for energy detection and an energy detection operation. If sensing for energy detection is not performed, the process proceeds to S324. When the energy detection operation is performed, if the energy level is lower than the energy detection threshold value (i.e., idle), the process proceeds to S324. If the energy level exceeds the energy detection threshold value (i.e., busy), the process returns to S316. That is, one defer duration is reapplied after the channel is idle, and N does not count down during the defer duration.

S324: The process proceeds to S318.

The channel access procedure described with reference to FIGS. 15 and 16 may be used not only for DL transmission but also for UL transmission. Therefore, the base station as well as the user equipment may access the channel according to the channel access procedure described with reference to FIG. 15 and FIG. 16. In the channel access procedure described with reference to FIG. 15 and FIG. 16, the wireless communication device waits for a slot duration by a random number in order to disperse access time points of various wireless communication devices that perform channel access. Therefore, the probability of selecting one of the values in the above-described CWS is uniform. In addition, for the purpose of access distribution, the wireless communication device should wait for another time according to the obtained random number.

As described above, the wireless communication device determines whether the channel is idle during the defer duration. After the defer duration, the wireless communication device waits based on the counter value N determined based on the random number and the slot duration. In this case, the base station may start traffic transmission when the counter value N is 0. In a specific embodiment, the traffic may be a data channel. Specifically, the data channel may be either a PDSCH or a PUSCH. In yet another specific embodiment, the traffic may be a control channel. At this time, the control channel may be a PDCCH or an EPDCCH. The wireless communication device sets the counter value N to be randomly selected for access distribution and determines whether the channel to be accessed during a slot duration is idle according to the corresponding counter value. For convenience of explanation, this counter value setting procedure is referred to as a random counter value setting procedure.

Specifically, the wireless communication device senses whether the channel is idle during the defer duration. When the channel is idle during the defer duration, the wireless communication device may set the counter value according to the following procedure.

1) The wireless communication device sets counter (N)=Ninit. Ninit is a random number uniformly distributed within 0 and $CW_p$.
2) When N>0 and the wireless communication device determines to decrease N, set N=N−1.
3) Senses the channel during one additional slot duration, and when the channel is idle during that one slot duration, the wireless communication device goes to step 4), otherwise goes to step 5).
4) When N=0, the wireless communication device stops the counter value setting procedure. When not N=0, the wireless communication device goes to step 2). 5) The wireless communication device senses the channel during one additional defer duration.
6) When the channel is idle during a plurality of slot durations that include one additional defer duration, the wireless communication device goes to step 2), and when the channel is not idle during that one additional defer duration, the wireless communication device goes to step 5).

When the wireless communication terminal fails to transmit traffic on the channel to be accessed in step 4) in the above-described procedure, the wireless communication terminal may transmit traffic when the channel is idle during one additional defer duration. In addition, when the wireless communication device stops the counter value setting procedure, the wireless communication device starts the traffic transmission.

When the traffic includes a data channel, the defer duration may be set according to the channel access priority class of the traffic that the data channel is included in. At this time, the channel access priority class may be a channel access priority class. Also, the defer duration may be composed of 16 us (Tf) and $m_p$ number of slot durations. At this time, each slot duration Tsl may be 9 us. Tf includes one idle slot duration Tsl. Also, the $m_p$ value may be set according to the channel access priority class as shown in Table 2 below.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may also set a range of CW values according to the channel access priority class. Specifically, the wireless communication device may set the range of the CW values to satisfy $CW_{min,p} \leq CW_p \leq CW_{max,p}$. At this time, the value of $CW_{min,p}$ and the value of $CW_{max,p}$ may be determined according to the channel access priority class as shown in Table 2 described above. Also, the wireless communication device may set the value of $CW_{min,p}$ and the value of $CW_{max,p}$ in step 1) of the counter value setting procedure. During channel access, the base station may adjust the CW value as described above.

Also, the maximum transmission duration $T_{\_mcot,p}$ (maximum channel occupancy time (MCOT)) that may be used in one transmission through a channel included in the unlicensed band may be determined according to the channel access priority of the transmitted data. Specifically, it may be determined as shown in Table 2 above. Accordingly, the wireless communication device should not maintain a transmission continuously more than a time T_mcot,p. In the unlicensed band, since it is a frequency band accessed by several wireless communication devices through contention procedures, it is not preferable that any one of the wireless communication devices continuously use the frequency band for a predetermined time or more. In Table 2, when the value of the channel access priority class is p=3 or p=4, in a long term, the unlicensed band is used according to the rule, and there is no wireless communication device using other technology, the wireless communication device may set to $T_{\_mcot,p}$=10 ms. Otherwise, the wireless communication device may set to $T_{\_mcot,p}$=8 ms.

Also, the wireless communication device determines whether the channel is idle based on an energy detection (ED) threshold value. Specifically, the wireless communication device may determine that the channel is idle when the energy detected by the channel is smaller than the threshold value. At this time, the ED threshold value may vary depending on whether or not a wireless communication device using other technology coexists. In addition, the ED threshold may vary depending on the country and region. Specifically, the ED threshold value may be determined as shown in Table 3 below.

random number is obtained and used based on the largest CWS among the CWS corresponding to each carrier, the corresponding channel access may be classified as Type A2. In addition, when a wireless communication device accesses a channel on a plurality of carriers based on the channel access procedure for any one carrier, the corresponding channel access may be classified as Type B.

When a wireless communication device accesses a channel on a plurality of carriers according to the classification described above, the wireless communication device may not be able to start transmissions simultaneously on a plurality of carriers. This is because channel states corresponding to each of a plurality of carriers may be different from each other and channel access parameters corresponding to each of a plurality of carriers, for example, defer duration may be different. At this time, due to the RF leakage occurring from the channel or the carrier which starts transmission relatively first, the wireless communication device may not be able to transmit signals on the channel or carrier that starts transmission at a relatively later time.

Therefore, the wireless communication device may perform an operation for starting transmission simultaneously on a plurality of carriers in the counter value setting procedure described above. Specifically, in the counter value setting procedure described above, the wireless communication device may selectively subtract 1 from the counter value. Through this, the wireless communication device may delay the start of transmission on any one channel. As described above, this may be referred to as self-deferral.

In a case where the terminal performs the transmission by aggregating a plurality of carriers while performing channel access according to the LBT procedure according to Category 4 described above, the terminal may perform the LBT

TABLE 3

| Case | ED adaptation rule | Note |
|---|---|---|
| Case 1: Coexistance with other technologies | $X_{Thresh\_max} = \max\left\{ \begin{array}{l} -72 \text{ dBm}(20 \text{ MHz}), \\ \min\left\{ \begin{array}{l} T_{max}, \\ T_{max} - T_A + (P_H - P_{TX}) \end{array} \right\} \end{array} \right\}$<br>$P_H$ = 23 dB<br>$P_{TX}$ is the set Max eNB output power in dBm for the carrier | $T_A$ = 10 dB for fx(s) including PDSCH;<br>$T_A$ = 5 dB for fx(s) including DRS transmission(s) and not including PDSCH |
| Case 2: Absence of Wi-Fi(e.g: by level of regulation) | $X_{Thresh\_max} = \min\left\{ \begin{array}{l} T_{max} + 10 \text{ dB}, \\ X, \end{array} \right\}$<br>Xr[dBm] is MAX ED threshold defined by regulation<br>Otherwise | |

In this case, the value of $T_{\_max}$ in Table 3 may be determined as shown in the following equation.

$T_{max}$(dBm)=10·log 10(3.16228·10$^{-8}$
(mW/MHz)·BWMHz(MHz))

The wireless communication device may perform transmission through a plurality of carriers. Thus, the embodiments described above may be used equally when a wireless communication device accesses a channel on any one carrier as well as through a plurality of carriers. At this time, channel access methods for a plurality of carriers may be distinguished as follows. When the wireless communication device performs the channel access procedure independently from each of a plurality of carriers, the corresponding channel access may be classified as Type A. In this case, when the wireless communication device obtains a random number independently for each carrier, the corresponding channel access may be classified as Type A1. Also, when one procedure according to Category 4 in one carrier and the remaining carriers may perform the LBT procedure for sensing whether the carrier is idle for a single time interval Tmc. In this case, the single time interval may be 25 us. In more detail, the terminal may select a carrier to perform an LBT procedure according to Category 4 according to any one of the following embodiments.

The terminal may select a carrier having the lowest index among the plurality of carriers indicated in which the LBT according to Category 4 is used as a carrier to perform the LBT procedure according to Category 4. In this embodiment, since the terminal selects a carrier based on the UL grant received by the terminal, even if the terminal does not receive the UL grant, it can operate robustly.

The terminal may select a carrier having the largest CWS among the plurality of carriers indicated in which the LBT according to Category 4 is used as a carrier to perform the LBT procedure according to Category 4. According to this embodiment, the terminal can ensure maximum fairness with other wireless communication devices using the unlicensed band. In addition, since the terminal selects a carrier based on the UL grant received by the terminal, even if the terminal does not receive the UL grant, the terminal can operate robustly.

The terminal may select a carrier having the smallest CWS among the plurality of carriers indicated in which the LBT according to Category 4 is used as a carrier to perform the LBT procedure according to Category 4. According to this embodiment, the terminal may increase transmission efficiency while considering the fairness with other wireless communication devices using an unlicensed band. In addition, since the terminal selects a carrier based on the UL grant received by the terminal, even if the terminal does not receive the UL grant, the terminal can operate robustly.

The terminal may select a carrier having the largest backoff counter among the plurality of carriers indicated in which the LBT according to Category 4 as a carrier to perform the LBT procedure according to Category 4. According to this embodiment, the terminal can ensure maximum fairness with other wireless communication devices using the unlicensed band. In addition, since the terminal selects a carrier based on the UL grant received by the terminal, even if the terminal does not receive the UL grant, the terminal can operate robustly.

The terminal may select a carrier having the smallest backoff counter among the plurality of carriers indicated in which the LBT according to Category 4 is used as a carrier to perform the LBT procedure according to Category 4. According to this embodiment, the terminal may increase transmission efficiency while considering the fairness with other wireless communication devices using an unlicensed band. In addition, since the terminal selects a carrier based on the UL grant received by the terminal, even if the terminal does not receive the UL grant, the terminal can operate robustly.

The terminal may randomly select any one of the plurality of carriers indicated in which the LBT according to Category 4 is used as a carrier to perform the LBT procedure according to Category 4. In this case, each of the plurality of carriers may be selected with an equal probability. According to this embodiment, the terminal may increase transmission efficiency while considering the fairness with other wireless communication devices using an unlicensed band. In addition, since the terminal selects a carrier based on the UL grant received by the terminal, even if the terminal does not receive the UL grant, the terminal can operate robustly.

Figure 17:
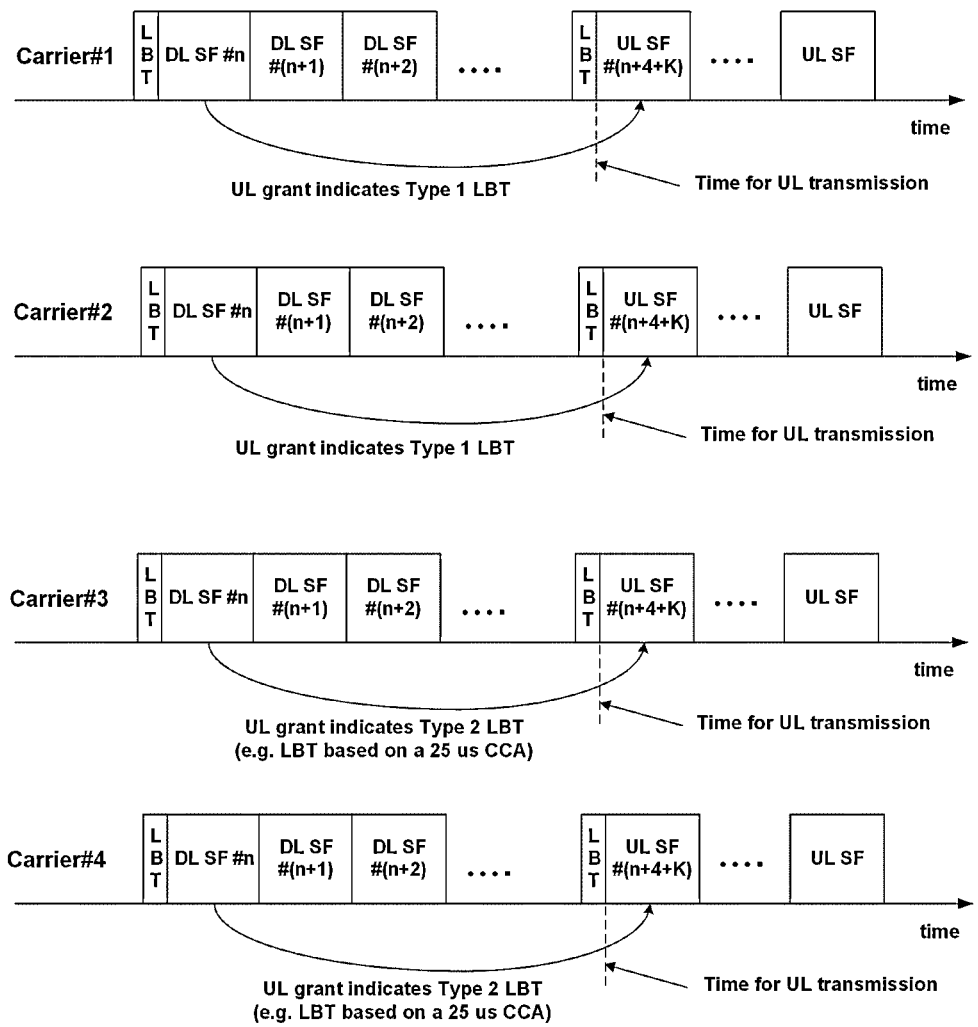
FIG. 17 illustrates a channel access method of a terminal when the terminal aggregates a plurality of carriers according to an embodiment of the present invention.

FIG. 17 illustrates a channel access method of a terminal when the terminal aggregates a plurality of carriers according to an embodiment of the present invention.

When the terminal aggregates a plurality of carriers, the base station may indicate two or more channel accesses for the plurality of carriers allocated to the terminal. Specifically, the base station may indicate the first type channel access for any one carrier allocated to the terminal, and indicate the second type channel access for the other carrier allocated to the terminal. In the embodiment of FIG. 17, the base station configures a channel access type for the terminal to use when transmitting UL on each of the first carrier Caririer #1 to the fourth carrier Carrier #4 using the UL grant. In more detail, the base station configures the first type channel access Type 1 LBT as a channel access type to be used by a terminal in the first carrier Caririer #1) and the second carrier Carrier #2, and configures the second type channel access Type 2 LBT as a channel access type to be used by the terminal in the third carrier Caririer #3) and the fourth carrier Carrier #4. In this case, a specific method of performing channel access by the terminal is problematic.

When the base station indicates two or more channel accesses for a plurality of carriers designated to the terminal, the terminal may perform channel access according to a channel access type determined according to a specific embodiment in any one of a plurality of carriers, and perform the second type channel access in each of the remaining carriers. Specifically, the terminal may randomly select any one of the plurality of carriers, perform channel access according to a channel access type determined according to a specific embodiment on the selected carrier, and perform the second type channel access in each of the remaining carriers. In this case, the channel access type determined according to a specific embodiment may be the first type channel access regardless of the channel access type designated to the carrier by the base station. In another specific embodiment, the channel access type determined according to the specific embodiment may be a channel access type designated by the base station to the carrier. According to such embodiments, the terminal may increase transmission efficiency while considering the fairness with other wireless communication devices using an unlicensed band. In addition, since the terminal selects a carrier based on the UL grant received by the terminal, even if the terminal does not receive the UL grant, the terminal can operate robustly.

In the above-described embodiments, the terminal may perform the UL transmission without the UL grant received from the base station. For convenience of description, the UL transmission performed by the terminal without the UL grant received from the base station is referred to as autonomous UL (AUL) transmission. In addition, the transmission performed by the terminal according to the scheduling indicated by the UL grant received from the base station is referred to as a scheduled UL (SUL) transmission. Since the terminal performs UL transmission without UL grant in the AUL transmission, there is a need for a UL transmission method considering this and a method for signaling information required for the AUL transmission by a base station. First, a method of a base station to configure a resource through which a terminal performs the AUL transmission will be described.

The base station may configure a period of a resource for the AUL transmission by using an RRC configuration. In addition, the base station may use the DL control channel to trigger the AUL transmission of the terminal or to stop the AUL transmission attempt of the terminal. In this case, the DL channel may be a PDCCH or an EPDCCH. In more detail, the base station may activate or deactivate the AUL transmission of a terminal using a DL control channel. According to a specific embodiment, the base station may configure a resource for the AUL transmission of the terminal by using RNTI indicated to configure the resource for the AUL transmission of the terminal. For convenience of description, RNTI indicated to configure a resource for a AUL transmission of the terminal is referred to as an AUL transmission RNTI. In this case, the terminal may monitor the DL control channel scrambled with the AUL transmission RNTI. When the terminal receives the DL control channel scrambled with the AUL transmission RNTI, the terminal may activate the AUL transmission based on the RNTI. In addition, when the terminal receives the DL control channel scrambled with the AUL transmission RNTI, the terminal may configure a resource for AUL transmission based on the RNTI. When period of time resource is not configured by the RRC configuration or the AUL transmission RNTI overrides the period of time resource configured by the RRC configuration, the terminal may determine a time resource for the AUL transmission based on the DL control channel scrambled with the AUL transmission RNTI. In addition, the base station may release the resource for the AUL transmission of the terminal using the AUL transmission RNTI of the terminal. In this case, the terminal may monitor the DL control channel scrambled with the AUL transmission RNTI. When the terminal receives the DL control channel scrambled with the AUL transmission RNTI, the terminal may deactivate the AUL transmission based on the RNTI. In addition, when the terminal receives the DL control channel scrambled with the AUL transmission RNTI, the terminal may release the resource for the AUL transmission based on the RNTI.

When self-carrier scheduling is used, the AUL transmission RNTI may be semi-persistence scheduling (SPS) RNTI. In addition, the base station may configure or release the resource for the AUL transmission of the terminal by transmitting the SPS-RNTI in the SCell. In this case, the terminal may monitor the SPS-RNTI for configuring the resource for the AUL transmission of the terminal in the SCell. This is because the existing SPS-RNTI is transmitted only in the PCell, and the terminal does not monitor the existing SPS-RNTI in the SCell. In addition, the base station may configure the AUL transmission RNTI as grouped terminal-common so that it may be configured to monitor the DL control channel scrambled with the AUL transmission RNTI. Therefore, the AUL transmission RNTI may be common to the terminal group. In more detail, the base station may configure the AUL transmission RNTI to a terminal commonly having an AUL transmission capability in a LAA SCell. The AUL transmission RNTI may be common to a terminal having capability for the AUL transmission in a LAA SCell. When a cross-carrier scheduling is used, the AUL transmission RNTI may be an RNTI other than the SPS-RNTI. Since the SPS-RNTI in PCell is configured for SPS transmission, in order to distinguish with the SPS-RNTI in PCell, the AUL transmission RNTI is configured separately and common to the terminal so that it is possible to enable a terminal with the AUL transmission capability to monitor the DL control channel scrambled with the AUL transmission RNTI.

The terminal may randomly attempt an AUL transmission within a time resource configured for the AUL transmission. However, when the terminal aggregates the PCell and the LAA SCell, it may not be desirable for the terminal to transmit without subframe alignment between the PCell and the LAA SCell. Therefore, when the terminal performs the AUL transmission, the terminal may perform the AUL transmission by aligning subframes between the PCell and the LAA SCell.

The UL subframe for the SUL transmission and the UL subframe for the AUL transmission may be scheduled by the base station to the terminal. Therefore, as in the legacy LAA system, the terminal may assume that the terminal is scheduled according to a subframe boundary between the PCell and the LAA SCell. However, a start time point of the AUL transmission may be arbitrarily determined in an AUL transmission subframe configured as an AUL transmission resource. This is because the AUL transmission and the SUL transmission from the same terminal or different terminals can be performed simultaneously.

When the position of the DM-RS is fixed in the UL subframe, the terminal may perform the AUL transmission including a UL Demodulation-Reference Signal (DM-RS). In more detail, the terminal may transmit an UL partial subframe including at least one PUSCH DM-RS. In this case, the partial subframe may indicate a subframe that does not include all 14 symbols. In more detail, the partial subframe may indicate a subframe including a smaller number of symbols than 14 symbols. According to a specific embodiment, the terminal may start the AUL transmission randomly from a resource for the AUL transmission after channel access, and perform the AUL transmission so that the UL subframe of the AUL transmission includes at least one PUSCH DM-RS. In this case, the base station may allocate different cyclic shift values to the plurality of respective terminals. When the terminal performs the AUL transmission, the terminal may transmit the UL DM-RS using the value of the cyclic shift allocated by the base station to the terminal. The base station may detect a value of the cyclic shift of the UL DM-RS transmitted by the terminal. In this case, the terminal may identify the terminal performing the AUL transmission by associating the detected value of the cyclic shift with the value of the cyclic shift allocated to each of the plurality of terminals. In addition, when retransmission of the AUL transmission performed by the terminal is necessary, the base station may transmit a UL grant requesting retransmission of the terminal identified as having performed the AUL transmission.

When the position of the DM-RS in the UL subframe is configured to be a symbol other than the 4th and 11th symbols used as the position of the DM-RS in the legacy LTE system, the terminal may transmit the DM-RS at a predetermined position within the UL subframe of the AUL transmission. In more detail, the terminal may transmit the UL DM-RS in the first SC-FDMA symbol among a plurality of symbols included in the UL subframe of the AUL transmission. In another specific embodiment, the terminal may transmit the UL DM-RS in the first SC-FDMA symbol after the channel access for the AUL transmission is successful.

Since the base station may schedule both the UL subframe for the SUL transmission and the UL subframe for the AUL transmission to the terminal, the resource allocated for the SUL transmission to the terminal and the resource for the AUL transmission may collide. In this case, the terminal may prioritize the SUL transmission over the AUL transmission in the corresponding resource. In more detail, the terminal may perform the SUL transmission without performing the AUL transmission in a corresponding resource. This is because the resources allocated to the SUL transmission are more likely larger than the resource for the AUL transmission. In addition, this is because the base station has a high possibility of scheduling the high priority traffic to the SUL transmission.

In an SUL transmission, the terminal may attempt channel access for the SUL transmission according to a channel access parameter indicated by the base station. In more detail, the base station may indicate at least one of a channel access type and a channel access priority class. In addition, the base station may indicate a PUSCH transmission start time point and a PUSCH transmission completion time point transmitted through the UL grant transmission using the UL grant. In this case, the terminal may attempt channel access based on at least one of a channel access type and a channel access priority class indicated by the base station before the PUSCH transmission start time point. When the terminal performs a AUL transmission, the terminal does not explicitly receive the UL grant received from the base station. Therefore, when a terminal attempts to access a channel for the AUL transmission, it may be an issue of what type of channel access the terminal should use and with which channel access parameter a channel access is performed. An embodiment therefor will be described.

When the base station transmits a UL grant to the terminal, the base station may perform channel access based on the backoff. At this time, if the base station succeeds in the backoff-based channel access, the base station transmits a UL grant to the terminal. Therefore, if a specific condition is satisfied, the terminal may perform the second type channel access that performs channel sensing for a predetermined single time interval without backoff for an SUL transmission. The designated time interval may be 25 us. In addition, the specific condition may include a case where transmission of the terminal is within a channel occupancy time (COT) obtained by the base station. The COT obtained by the base station may be determined by the MCOT. In addition, it may include the case in the COT obtained by the base station. The paused MCOT may indicate that the MCOT is calculated by excluding the predetermined time until the SUL transmission after the UL grant transmission from the MCOT. In the case of AUL transmissions that can perform transmission without a UL grant, since the base station does not perform channel access to transmit the UL grant, the terminal may operate in consideration of fairness with other wireless communication devices using an unlicensed band, such as a Wi-Fi terminal. Specific conditions will be described in detail with reference to FIGS. 18 to 19.

In addition, if a specific condition is not satisfied, the terminal may perform the first type (Type 1) channel access, which is a channel access based on a random backoff during UL transmission. In more detail, when the terminal performs channel access for a AUL transmission, the terminal may perform the first type (type 1) channel access regardless of the signaling received from the base station. The first type channel access may be the channel access based on the random backoff in which the size of CW varies according to the channel access priority class. In more detail, the first type channel access may be a Category 4 channel access described above with reference to FIGS. 15 and 16. According to such an embodiment, the terminal may secure fairness with other wireless communication devices using an unlicensed band such as a Wi-Fi terminal.

When the terminal performs the first type channel access for a AUL transmission, it can be an issue of which channel access priority class to use. According to a specific embodiment, the terminal may select a channel access priority class according to the type of traffic to be transmitted in the AUL transmission. In addition, the channel access priority corresponding to the type of traffic may be determined according to the implementation manner of the terminal.

In addition, depending on whether the resource used by the terminal for a AUL transmission is a resource allocated only to the terminal by the base station, the terminal may determine the channel access priority class to use for channel access for the AUL transmission. Specifically, when the resource used by the terminal for the AUL transmission is a resource allocated only to the terminal by the base station, the terminal may perform channel access for the AUL transmission using the channel access priority class with the highest priority. In this case, the value of the channel access priority class with the highest priority may be 1. According to this embodiment, when the terminal attempts the AUL transmission using a resource allocated by the base station only to the terminal, the terminal may increase the probability of success of the AUL transmission. If the resource used by the terminal for the AUL transmission is not a resource allocated only to the terminal by the base station, the terminal may perform channel access for the AUL transmission using the lowest channel access priority class. In this case, the value of the channel access priority class with the lowest priority may be 4. If the resource used by the terminal for the AUL transmission is not a resource allocated only to the terminal by the base station, it may be the case where the base station semi-static configures a resource used by the terminal during the AUL transmission as a resource that can be used by a plurality of terminals.

In another specific embodiment, regardless of whether the resource used by the terminal for an AUL transmission is a resource allocated only to the terminal by the base station, the terminal may perform channel access for the AUL transmission using the lowest channel access priority class.

In another specific embodiment, the terminal may perform channel access for an AUL transmission based on a channel access procedure used for an SUL transmission. When the resource for an AUL transmission is in the MCOT or the paused MCOT, the terminal may perform the second type channel access for the AUL transmission. In addition, if all resources for the AUL transmission are not included in the MCOT and the pause MCOT, the terminal may perform the first type channel access.

When a resource for an AUL transmission are included in a channel occupancy time (COT) that is configured based on a UL grant received by the terminal, the terminal may perform the second type channel access. When the resource for the AUL transmission is within 25 us from a DL transmission interval transmitted from a base station using the same carrier as the corresponding resource, the terminal may perform the second type channel access for the AUL transmission.

A resource for an AUL transmission and a resource for an SUL transmission may be configured so that the resource for AUL transmission and the resource for the SUL transmission are continuously. In this case, the resource may include a subframe. In the following description, a resource may indicate a subframe. In more detail, a subframe for the SUL transmission may be located immediately after the subframe for the AUL transmission. In addition, a subframe for the AUL transmission may be located immediately after the subframe for the SUL transmission. In this case, the terminal may perform channel access for UL transmission based on the location of the resource for the AUL transmission and the resource for SUL transmission. First, when the resource for the SUL transmission is continuously located after the resource for the AUL transmission, a channel access method of the terminal will be described. In this specification, successive subframes or resources may indicate that there is no gap between subframes or resources. Therefore, a case where the resource for SUL transmission is consecutively located after the resource for the AUL transmission may include that at least one subframe for the SUL is continuous after the at least one subframe for the AUL transmission.

Figure 18:
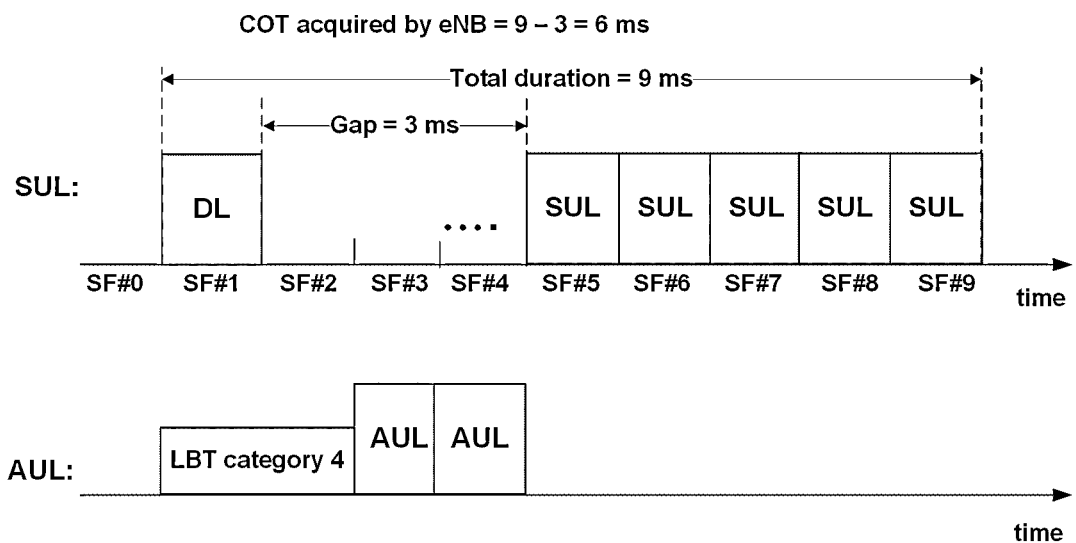
FIG. 18 illustrates SUL transmission of a terminal when a subframe for an SUL transmission of the terminal is continuous after a subframe for AUL transmission of the terminal according to an embodiment of the present invention.

FIG. 18 illustrates an SUL transmission of a terminal when a subframe for the SUL transmission of the terminal is continuous after a subframe for an AUL transmission of the terminal according to an embodiment of the present invention. In the embodiment of FIG. 18, both a subframe for the AUL transmission and a subframe for the SUL transmission of the terminal are included in the COT obtained by the base station.

As in the embodiment of FIG. 18, the resource for AUL transmission may be included in the COT obtained by the base station. In this case, the terminal may determine whether the AUL transmission resource is included in the COT obtained by the base station according to whether the resource for AUL transmission is configured within 16 us or 25 us after the DL transmission. When the resource for the AUL transmission is configured within 16 us or 25 us after DL transmission, the terminal may determine that there is an AUL transmission resource in the COT obtained by the base station. In this case, the terminal may perform an AUL transmission on the AUL transmission resource. As another method, the terminal may detect the control channel and determine whether the resource for AUL transmission is included in the COT obtained by the base station based on the detected control channel. In this case, the control channel may be a group common PDCCH (C-PDCCH) scrambled with a group common RNTI (or common control RNTI (CC-RNTI)) to transmit UL scheduling information or DL scheduling information to one or more terminals. When the resource for the AUL transmission is included in the COT obtained by the base station, the terminal may perform the AUL transmission without the LBT operation. In another specific embodiment, when a resource for the AUL transmission is included in a COT obtained by the base station, the terminal may perform the AUL transmission using the second type channel access. In this case, the duration of the single time interval of the second type channel access may be 25 us.

In addition, when a resource for the AUL transmission is included in the COT obtained by the base station and a subframe for the SUL transmission is located immediately after the subframe for the AUL transmission, the terminal may perform the SUL transmission regardless of the channel access type indicated by the base station through the UL grant for the SUL transmission. In detail, when a resource for AUL transmission is included in the COT obtained by the base station and a subframe for SUL transmission is located immediately after the subframe for the AUL transmission, the terminal may perform the SUL transmission without the LBT procedure. In another specific embodiment, when a resource for the AUL transmission is included in the COT obtained by the base station and a subframe for the SUL transmission is located immediately after the subframe for the AUL transmission, the terminal may perform the SUL transmission using the second type channel access regardless of the channel access type indicated through the UL grant.

In another specific embodiment, the terminal may perform the AUL transmission using the first type channel access regardless of whether a resource for the AUL transmission is included in the COT obtained by the base station. This is because the AUL transmission of the terminal is not performed based on the UL grant received from the base station, so it is necessary to consider the fairness with other wireless communication devices. When performing transmission using the first type channel access with the channel access type for the AUL transmission at the terminal and when a subframe for the SUL transmission is located immediately after the subframe for the AUL transmission, since the terminal basically receives signaling for the channel access type for the SUL through the UL grant, the base station may indicate to perform the first type channel access or the second type channel access on the terminal but the terminal may perform the SUL transmission regardless of the channel access type indicated through the UL grant. In more detail, when a subframe for the SUL transmission is located immediately after the subframe for the AUL transmission, the terminal may perform the SUL transmission without an LBT procedure. In another specific embodiment, when a subframe for the SUL transmission is located immediately after the subframe for the AUL transmission, the terminal may perform the SUL transmission using the second type channel access regardless of the channel access type indicated through the UL grant.

In another specific embodiment, the terminal may perform the AUL transmission using the first type channel access regardless of whether a resource for the AUL transmission is included in the COT obtained by the base station. When performing transmission using the first type channel access with the channel access type for the AUL transmission at the terminal, even if the subframe for the SUL transmission is located immediately after the subframe for AUL transmission, the COT obtained by the base station recognized by the terminal may be corrupted by the AUL transmission. In detail, when the AUL transmission occurs in a resource for the AUL transmission and when the AUL transmission does not occur, the terminal may recognize a COT obtained by the base station differently. In this case, the terminal may access the channel and perform the SUL transmission based on the channel access related parameter indicated by the base station through the UL grant in order for the SUL transmission. Specifically, when the COT is corrupted by the AUL transmission, the terminal may perform the SUL transmission using channel access according to the channel access type indicated by the base station through the UL grant. In addition, the terminal may perform the SUL transmission by performing channel access according to the channel access priority class indicated by the base station through the UL grant.

In another specific embodiment, the terminal may perform the AUL transmission using the first type channel access and a lowest priority class as a channel access method for the AUL transmission. When transmission using the first type channel access and a lowest priority class as a channel access type for the AUL transmission is performed by a terminal and a subframe for the SUL transmission is located immediately after the subframe for the AUL transmission, basically, the terminal may receive signaling for a channel access type for the SUL through the UL grant. Accordingly, the terminal may be indicated from the base station to perform the first type channel access or the second type channel access when the terminal performs a channel access for the SUL transmission. In this case, the terminal may perform the SUL transmission regardless of the channel access type indicated through the UL grant from the base station. In more detail, when a subframe for the SUL transmission is located immediately after the subframe for AUL transmission, the terminal may perform SUL transmission without an LBT procedure. In another specific embodiment, when the subframe for the SUL transmission is located immediately after the subframe for the AUL transmission, the terminal may perform the SUL transmission using the second type channel access regardless of the channel access type indicated through the UL grant.

A resource for AUL transmission is included in the COT obtained by the base station, and only some of the resource for SUL transmission may be included in the corresponding COT. Even in such a case, the terminal may perform the AUL transmission as in the operation embodiments of the terminal that may be applied to a case where the resource for the AUL transmission is included in the COT obtained by the base station. The terminal may determine the channel access type for the SUL transmission according to whether the resource for the SUL transmission is included in the COT obtained by the base station. In more detail, the terminal may perform the SUL transmission without LBT on a resource included in a COT obtained by a base station in the resource for SUL transmission. In another specific embodiment, the terminal may perform the SUL transmission using the second type channel access on a resource included in a COT obtained by the base station in the resource for the SUL transmission. In this case, the duration of the single time interval of the second type channel access may be 25 us. In addition, in a resource not included in the COT obtained by the base station of the resource for SUL the transmission, the terminal may access the channel and perform the SUL transmission based on a parameter related channel access indicated by the base station using the UL grant. In more detail, the terminal may perform the SUL transmission using a channel access according to a channel access type indicated by the base station through the UL grant. In addition, the terminal may perform the SUL transmission by accessing a channel according to a channel access priority class indicated by the base station using the UL grant.

In another specific embodiment, when a resource for the AUL transmission is included in the COT obtained by the base station and a subframe for the SUL transmission is located immediately after the subframe for the AUL transmission, only some of the resource for the SUL transmission may be included in the corresponding COT. A subframe for the AUL transmission and a subframe for the SUL transmission are located consecutively, and some of the subframes for the SUL transmission may be scheduled with a gap in an eNB shared COT. In this case, when the terminal may distinguish the subframes for the SUL transmission included in the eNB shared COT through a gap between the subframes for the SUL transmission, the terminal may perform the SUL transmission by accessing a channel without an access LBT procedure in a subframe for the SUL transmission included in an eNB shared COT. In another specific embodiment, the terminal may perform the SUL transmission using the second type channel access on a resource included in a COT obtained by a base station in the resource for SUL transmission. In this case, the duration of the single time interval of the second type channel access may be 25 us. In addition, in a resource not included in the COT obtained by the base station of the resource for SUL transmission, the terminal may access the channel and perform SUL transmission based on a parameter related channel access indicated by the base station using the UL grant. In more detail, the terminal may perform SUL transmission using channel access according to a channel access type indicated by the base station using a UL grant. In more detail, the terminal may access a channel according to a channel access priority class indicated by the base station using a UL grant to perform the SUL transmission.

In another specific embodiment, when a resource for the AUL transmission is included in the COT obtained by the base station and a subframe for the SUL transmission is located immediately after the subframe for the AUL transmission, only some of the resource for the SUL transmission may be included in the corresponding COT. In more detail, a subframe for the SUL transmission is located in consecutive to a subframe for the AUL transmission, and some of subframes for SUL transmission may be included in an eNB shared COT. At this time, even if the subframes for SUL transmission are scheduled in succession or with a gap, regardless of subframe for the AUL transmission, the terminal may perform the SUL transmission by accessing a channel based on a parameter related channel access indicated by the base station using a UL grant in a subframe for the SUL transmission. In more detail, the terminal may perform the SUL transmission using channel access according to a channel access type indicated by the base station using a UL grant. In more detail, the terminal may perform the SUL transmission using channel access according to a channel access priority class indicated by the base station using a UL grant.

In another specific embodiment, the terminal may perform AUL transmission using the first type channel access regardless of whether a resource for AUL transmission is included in the COT obtained by the base station. When the terminal uses the first type channel access with the channel access type for AUL transmission, even if the subframe for SUL transmission is located immediately after the subframe for the AUL transmission, the COT obtained by the base station recognized by the terminal may be corrupted by AUL transmission. In detail, when the AUL transmission occurs in a resource for the AUL transmission and when the AUL transmission does not occur, the terminal may recognize a COT obtained by the base station differently. In this case, the terminal may access the channel and perform the SUL transmission based on the channel access related parameter indicated by the base station through the UL grant in order for the SUL transmission. Specifically, when the COT is corrupted by AUL transmission, the terminal may perform SUL transmission using channel access according to the channel access type indicated by the base station through the UL grant. In addition, the terminal may perform the SUL transmission by performing channel access according to the channel access priority class indicated by the base station through the UL grant.

In another specific embodiment, regardless of whether the resource for the SUL transmission is included in the COT obtained by the base station, the terminal may perform SUL transmission using channel access according to the channel access type indicated by the base station through the UL grant. Further, regardless of whether the resource for the SUL transmission is included in the COT obtained by the base station, the terminal may perform channel access according to the channel access priority class indicated by the base station through the UL grant to perform SUL transmission.

The resource for the AUL transmission may be included in the COT obtained by the base station, and the resource for the SUL transmission may not be included. Even in such a case, the terminal may perform the AUL transmission as in the operation embodiments of the terminal that may be applied to a case where the resource for the AUL transmission is included in the COT obtained by the base station. The terminal may perform the SUL transmission without the LBT in the resource for the SUL transmission consecutive to the resource for the AUL transmission. In another specific embodiment, the terminal may perform the SUL transmission by using the second type channel access in resource for the SUL transmission consecutive to resource for the AUL transmission. In this case, the duration of the single time interval of the second type channel access may be 25 us. This is because the terminal is allowed to perform consecutive UL transmissions through one channel access. In another specific embodiment, the terminal may perform the SUL transmission by accessing a channel based on a parameter related channel access indicated by the base station through a UL grant. In more detail, the terminal may perform the SUL transmission using channel access according to a channel access type indicated by the base station through the UL grant. In addition, the terminal may perform the SUL transmission by performing channel access according to the channel access priority class indicated by the base station through the UL grant.

In another specific embodiment, the terminal may perform the AUL transmission using the first type channel access regardless of whether a resource for the AUL transmission is included in the COT obtained by the base station. This is because the AUL transmission of the terminal is not performed based on the UL grant received from the base station, so it is necessary to consider the fairness with other wireless communication devices. When performing transmission using the first type channel access with the channel access type for the AUL transmission at the terminal and when a subframe for the SUL transmission is located immediately after the subframe for the AUL transmission, the terminal may perform the SUL transmission regardless of the channel access type indicated through the UL grant. In more detail, when a subframe for the SUL transmission is located immediately after a subframe for the AUL transmission, the terminal may perform the SUL transmission without an LBT procedure. In another specific embodiment, when a subframe for SUL transmission is located immediately after a subframe for the AUL transmission, the terminal may perform the SUL transmission using the second type channel access regardless of the channel access type indicated through the UL grant.

In another specific embodiment, the terminal may perform the AUL transmission by accessing a channel using the first type channel access and a lowest priority class. The terminal accesses the channel using the first type channel access and the lowest priority class to perform the AUL transmission, and a subframe for the SUL transmission may be located immediately after a subframe for the AUL transmission. In this case, the terminal may perform the SUL transmission regardless of the channel access type indicated through the UL grant received from the base station. In more detail, when a subframe for the SUL transmission is located immediately after the subframe for the AUL transmission, the terminal may perform the SUL transmission without an LBT procedure. In another specific embodiment, when a subframe for the SUL transmission is located immediately after the subframe for AUL transmission, the terminal may perform SUL transmission using the second type channel access regardless of the channel access type indicated through the UL grant.

When the terminal performs the AUL transmission using the first type channel access, all resource for the SUL transmission scheduled by the base station to the terminal may be included in the COT obtained by the terminal through the first type channel access. In this case, the terminal may perform the SUL transmission without LBT. In another specific embodiment, the terminal may perform the SUL transmission using the second type channel access. In this case, the duration of the single time interval of the second type channel access may be 25 us. This is to allow the SUL transmission to be performed in the corresponding COT without the issue of fairness with other wireless communication devices because the terminal obtains the COT through the first type channel access while performing the AUL transmission.

As another embodiment, when the terminal performs the AUL transmission using the first type channel access and a subframe for the SUL transmission is located immediately after a subframe for AUL transmission, all resources for the SUL transmission scheduled by the base station to the terminal may be included in the COT obtained by the terminal through the first type channel access. In this case, the terminal may perform the SUL transmission without LBT. In another specific embodiment, the terminal may perform the SUL transmission using the second type channel access. In this case, the duration of the single time interval of the second type channel access may be 25 us. This is to allow transmission in the corresponding COT for the SUL transmission consecutive to the AUL transmission without the problem of fairness with other wireless communication devices because the terminal obtains the COT through the first type channel access while performing the AUL transmission.

In another specific embodiment, although the terminal performs the AUL transmission using the first type channel access and resource for the SUL transmission is included in the COT obtained by the terminal through the corresponding first type channel access, the terminal may perform the SUL transmission using the channel access type and channel access priority class indicated by the UL grant for SUL transmission.

When the terminal performs the AUL transmission using the first type channel access, some of the resources for the SUL transmission scheduled by the base station to the terminal may be included in the COT obtained by the terminal through the first type channel access. The terminal may determine the channel access type for the SUL transmission according to whether the resource for the SUL transmission is included in the COT obtained by the terminal. In more detail, the terminal may perform the SUL transmission without LBT on a resource included in a COT obtained by the terminal in the resource for the SUL transmission. In another specific embodiment, the terminal may perform the SUL transmission using the second type channel access on a resource included in a COT obtained by a terminal in the resource for SUL transmission. In this case, the duration of the single time interval of the second type channel access may be 25 us. In addition, in resources not included in the COT obtained by the terminal in the resource for SUL transmission, the terminal may perform SUL transmission by performing channel access according to a channel access type and a channel access priority class indicated by the UL grant.

In another specific embodiment, when a terminal performs the AUL transmission using the first type channel access and a subframe for the SUL transmission is located immediately after a subframe for the AUL transmission, only some of the resources for the SUL transmission scheduled by the base station to the terminal in the COT obtained by the terminal through the corresponding first type channel access may be included in the COT. When a subframe for the SUL is located in consecutive to the subframe for the AUL transmission, some of the subframes for the SUL in the COT obtained by the terminal are scheduled not to be consecutive (with a gap), and the terminal can distinguish the subframes for the SUL included in the COT obtained by the terminal to perform the SUL transmission through a gap, the terminal may perform SUL transmission by accessing a channel without an LBT procedure in a subframe for SUL transmission included in a COT obtained by the terminal. In another specific embodiment, the terminal may perform the SUL transmission using the second type channel access on a resource included in a COT obtained by the terminal in the resource for the SUL transmission. In this case, the duration of the single time interval of the second type channel access may be 25 us. In addition, in a resource not included in the COT obtained by the terminal of the resources for the SUL transmission, the terminal may access the channel and perform SUL transmission based on a parameter related channel access indicated by the base station using the UL grant. In more detail, the terminal may perform SUL transmission by accessing a channel according to a channel access type and a channel access priority class indicated by a base station using a UL grant.

As another embodiment, when the terminal performs the AUL transmission using the first type channel access, a subframe for the SUL transmission is located in consecutive to a subframe for the AUL transmission, and some of subframes for the SUL transmission are scheduled in succession (without a gap) in the COT obtained by the terminal, the terminal cannot perform channel access for the subframe for the SUL transmission included in the COT obtained by the terminal using a gap between the subframes for the SUL transmission. In this case, the terminal may perform the SUL transmission by accessing the channel without the LBT procedure. In another specific embodiment, the terminal may perform the SUL transmission using the second type channel access on a resource included in a COT obtained by a terminal in the resource for the SUL transmission.

In another specific embodiment, when the terminal performs the AUL transmission using the first type channel access and all of the resources for the SUL transmission are not included and only some resources therefor are included in the COT obtained by the terminal through the first type channel access, the terminal may perform the SUL transmission using the channel access type and channel access priority class indicated by the UL grant for the SUL transmission.

In addition, regardless of whether a resource for the SUL transmission is included in a COT obtained by the terminal, the terminal may access the channel and perform SUL transmission based on a parameter related the channel access, indicated by the base station through the UL grant. In more detail, regardless of whether a resource for the SUL transmission is included in a COT obtained by the terminal, the terminal may perform the SUL transmission using channel access according to a channel access type indicated by the base station through a UL grant. In addition, regardless of whether the resource for the SUL transmission is included in the COT obtained by the terminal, the terminal may perform the SUL transmission by accessing a channel according to a channel access priority class indicated by the base station through the UL grant.

When the terminal performs the AUL transmission using the first type channel access, the resources for the SUL transmission scheduled by the base station to the terminal may not be included in the COT obtained by the terminal through the first type channel access. A resource for the SUL transmission may be located in consecutive to the AUL outside the COT obtained by the terminal. In this case, the terminal may perform SUL transmission without LBT in resources for continuous SUL transmission by performing channel access for one AUL transmission. This is because the terminal is allowed to perform consecutive UL transmissions through one channel access. In another specific embodiment, the terminal may perform the SUL transmission by using the second type channel access in the resource for the SUL transmission consecutive to resource for the AUL transmission. In this case, the duration of the single time interval of the second type channel access may be 25 us. In another specific embodiment, the terminal may perform the SUL transmission by accessing a channel based on a parameter related channel access, indicated by the base station through a UL grant. In more detail, the terminal may perform the SUL transmission by performing channel access according to a channel access type and a channel access priority class indicated by the base station through a UL grant.

As another embodiment, the terminal performs the AUL transmission using the first type channel access, a subframe for SUL transmission is located in consecutive to a subframe for AUL transmission, and some of subframes for the SUL transmission are scheduled in succession in the COT obtained by the terminal. In this case the terminal cannot perform channel access using a gap between subframes for the SUL transmission. Therefore, the terminal may perform the SUL transmission without the LBT procedure. This is because the terminal is allowed to perform consecutive UL transmissions through one channel access. In another specific embodiment, the terminal may perform the SUL transmission using the second type channel access on a resource included in a COT obtained by the terminal in the resource for the SUL transmission.

In another specific embodiment, when the terminal performs the AUL transmission using the first type channel access and all of the resources for the SUL transmission are not included and only some resources therefor are included in the COT obtained by the terminal through the first type channel access, the terminal may perform the SUL transmission using a channel access type and a channel access priority class indicated by the UL grant for SUL transmission.

The base station may configure a interval in which UL transmission may occur from the terminal using the control channel. In more detail, the base station may configure an interval for UL transmission by indicating a UL duration and a UL offset by using a control channel. In this case, the terminal may perform the SUL transmission using a second type channel access in the interval for the UL transmission indicated in UL duration and UL offset. In addition, the control channel may be a group common PDCCH (C-PDCCH). Both the resource for the AUL transmission and the resource for the SUL transmission in consecutive to the AUL transmission may be included in the COT obtained by the base station in the indicated UL interval through the control channel. The terminal may detect the control channel and determine whether the resource for the AUL transmission is included in the COT obtained by the base station based on the detected control channel. When the resource for the AUL transmission is included in the COT obtained by the base station, the terminal may perform the AUL transmission without LBT in the resource for the AUL transmission. In another specific embodiment, the terminal may perform the AUL transmission using the second type channel access in the resource for the AUL transmission. In this case, the duration of the single time interval of the second type channel access may be 25 us. In addition, the terminal may perform the SUL transmission without the LBT in the resource for the SUL transmission consecutive to the resource for the AUL transmission. In another specific embodiment, the terminal may perform the SUL transmission by using the second type channel access in resources for the SUL transmission consecutive to the resource for the AUL transmission. In this case, the duration of the single time interval of the second type channel access may be 25 us. This is because the terminal is allowed to perform consecutive UL transmissions through one channel access.

In another specific embodiment, regardless of whether a resource for the AUL transmission and a resource for the SUL transmission consecutive to AUL transmission are included in a COT obtained by the base station within a indicated UL interval through a control channel, the terminal may perform the AUL transmission using the first type channel access. This is because the AUL transmission of the terminal is not performed based on the UL grant received from the base station, so it is necessary to consider the fairness with other wireless communication devices.

In addition, the terminal may perform the SUL transmission regardless of the channel access type indicated by the base station through a UL grant. In detail, when a resource for the AUL transmission is included in the COT obtained by the base station and a subframe for the SUL transmission is located immediately after a subframe for the AUL transmission, the terminal may perform SUL transmission without the LBT procedure. In another specific embodiment, when the resource for the AUL transmission is included in the COT obtained by the base station and the subframe for the SUL transmission is located immediately after the subframe for the AUL transmission, the terminal may perform the SUL transmission using the second type channel access regardless of the channel access type indicated through the UL grant.

In such embodiments, even if a resource for the AUL transmission is included in the COT obtained by the base station and a subframe for the SUL transmission is located immediately after the subframe for the AUL transmission, the COT obtained by the base station recognized by the terminal may be corrupted by the AUL transmission. In detail, when the AUL transmission occurs in a resource for the AUL transmission and when the AUL transmission does not occur, the terminal may recognize a COT obtained by the base station differently. In this case, the terminal may access the channel and perform SUL transmission based on a parameter related the channel access indicated by the base station through the UL grant in order for the SUL transmission. Specifically, when the COT is corrupted by AUL transmission, the terminal may perform SUL transmission using channel access according to the channel access type indicated by the base station through the UL grant. In addition, the terminal may perform the SUL transmission by performing channel access according to a channel access priority class indicated by the base station through a UL grant.

A resource for the AUL transmission is included in a indicated UL interval through a control channel, but only some of resources for SUL transmission that is configured in consecutive to the AUL transmission may be included in a COT obtained by the base station. The terminal may detect the control channel and determine whether the resource for the AUL transmission is included in the COT obtained by the base station based on the detected control channel. Even in such a case, the terminal may perform the AUL transmission as in the operation embodiments of the terminal that may be applied to a case where the resource for the AUL transmission is included in the COT obtained by the base station. The terminal may determine the channel access type for the SUL transmission according to whether the resource for the SUL transmission is included in the COT. In more detail, the terminal may perform the SUL transmission without LBT on a resource included in a COT obtained by the base station in the resource for the SUL transmission. In another specific embodiment, the terminal may perform the SUL transmission using the second type channel access on a resource included in a COT obtained by the base station in the resource for the SUL transmission. In this case, the duration of the single time interval of the second type channel access may be 25 us. In addition, in a resource not included in the COT obtained by the base station of the resource for the SUL transmission, the terminal may access the channel and perform the SUL transmission based on a parameter related channel access indicated by the base station using the UL grant. In more detail, the terminal may perform the SUL transmission by accessing a channel according to a channel access type and a channel access priority class indicated by the base station using a UL grant. In such embodiments, even if some of the resources for the SUL transmission are included in the COT obtained by the base station, when the COT is corrupted by the AUL transmission, the terminal may access the channel and perform the SUL transmission based on a parameter related the channel access indicated by the base station through the UL grant. Specifically, when the COT is corrupted by the AUL transmission, the terminal may perform the SUL transmission using channel access according to the channel access type indicated by the base station through the UL grant. In addition, when the COT is corrupted by the AUL transmission, the terminal may perform channel access according to the channel access priority class indicated by the base station through the UL grant to perform SUL transmission.

In another specific embodiment, regardless of whether a resource for the SUL transmission is included in a COT obtained by the base station within a UL interval, the terminal may perform the SUL transmission using channel access according to a channel access type indicated by the base station through the UL grant. In addition, regardless of whether the resource for the SUL transmission in the UL interval is included in the COT obtained by the base station, the terminal may perform channel access according to the channel access priority class indicated by the base station through the UL grant to perform SUL transmission.

A resource for the AUL transmission is included in a indicated UL interval through a control channel, but a resource for the SUL transmission that is configured in consecutive to the AUL transmission may not be included in a COT obtained by the base station. The terminal may detect the control channel and determine whether the resource for the AUL transmission is included in the COT obtained by the base station based on the detected control channel. Even in such a case, the terminal may perform the AUL transmission as in the operation embodiments of the terminal that may be applied to a case where the resource for the AUL transmission is included in the COT obtained by the base station. In addition, the terminal may perform the SUL transmission without the LBT in the resource for the SUL transmission consecutive to the resource for the AUL transmission. In another specific embodiment, the terminal may perform the SUL transmission by using the second type channel access in resources for the SUL transmission consecutive to the resource for the AUL transmission. In this case, the duration of the single time interval of the second type channel access may be 25 us. This is because the terminal is allowed to perform consecutive UL transmissions through one channel access. In another specific embodiment, the terminal may perform the SUL transmission by accessing a channel based on a parameter related channel access, indicated by the base station through a UL grant. In more detail, the terminal may perform SUL transmission by performing channel access according to the channel access type and the channel access priority class indicated by the base station through the UL grant.

Previously, when resources for SUL transmission are continuously located after resources for AUL transmission, a channel access method of the terminal has been described. When a resource for the AUL transmission are continuously located after a resource for the SUL transmission, a channel access method of the terminal will be described. A case where the resource for the AUL transmission are consecutively located after the resource for the SUL transmission may include that at least one subframe for the AUL transmission is continuous after the at least one subframe for the SUL transmission.

Figure 19:
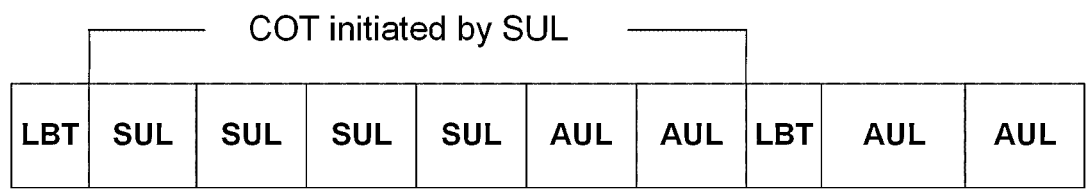
FIG. 19 illustrates AUL transmission of a terminal when a subframe for the AUL transmission is continuous after a subframe for the SUL transmission of the terminal according to an embodiment of the present invention.

FIG. 19 illustrates AUL transmission of a terminal when a subframe for the AUL transmission is continuous after a subframe for the SUL transmission of the terminal according to an embodiment of the present invention.

The resource for the SUL transmission may be included in the COT obtained by the base station. In more detail, the resource for the SUL transmission may be configured within 16 us or 25 us following DL transmission. The terminal may detect the control channel and determine that the resource for the SUL transmission is included in the COT. In this case, the control channel may be a group common PDCCH (C-PDCCH). When the resource for the SUL transmission are included in the COT obtained by the base station, the terminal may perform the SUL transmission without the LBT operation. In another specific embodiment, when a resource for the SUL transmission is included in a COT obtained by the base station, the terminal may perform the SUL transmission using the second type channel access. In this case, the duration of the single time interval of the second type channel access may be 25 us.

In addition, when the resource for the AUL transmission are included in the COT obtained by the base station, the terminal may perform the AUL transmission without the LBT operation. In another specific embodiment, when a resource for the AUL transmission is included in a COT obtained by the base station, the terminal may perform the AUL transmission using the second type channel access. In this case, the duration of the single time interval of the second type channel access may be 25 us. In another specific embodiment, the terminal may perform the AUL transmission using the first type channel access regardless of whether the resource for the AUL transmission is included in the COT obtained by the base station. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

As illustrated in the embodiment of FIG. 19, the resource for the SUL transmission may be included in a COT obtained by the base station, and only some of the resource for the AUL transmission may be included in the corresponding COT. Even in such a case, the terminal may perform the SUL transmission as in the operation embodiments of the terminal that may be applied to a case where the resource for the SUL transmission is included in the COT obtained by the base station. The terminal may determine the channel access type for the AUL transmission according to whether the resource for the AUL transmission is included in the COT obtained by the base station. In more detail, the terminal may perform the AUL transmission without LBT on a resource included in a COT obtained by the base station in the resource for the AUL transmission. In another specific embodiment, the terminal may perform the AUL transmission using the second type channel access on a resource included in a COT obtained by the base station in the resource for the AUL transmission. In this case, the duration of the single time interval of the second type channel access may be 25 us. Also, in a resource not included in the COT obtained by the base station in the resource for the AUL transmission, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

In another specific embodiment regardless of whether the resource for the AUL transmission are included in the COT obtained by the base station, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

A resource for the SUL transmission may be included in the COT obtained by the base station, and the resource for the AUL transmission may not be included in the corresponding COT. In this case, the terminal may perform the AUL transmission without the LBT operation. In another specific embodiment, the terminal may perform the AUL transmission using the second type channel access. In this case, the duration of the single time interval of the second type channel access may be 25 us. In another specific embodiment, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

The resource for the AUL transmission may be included in the COT obtained by the terminal in a channel access for the SUL. In this case, the terminal may perform the AUL transmission without the LBT operation. In another specific embodiment, the terminal may perform the AUL transmission using the second type channel access. In this case, the duration of the single time interval of the second type channel access may be 25 us. In another specific embodiment, even when the resource for the AUL transmission are included in a COT obtained by the terminal in a channel access for the SUL, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of AUL transmission, the channel access priority class to be used for channel access is not indicated by the UL grant.

Some of the resources for the AUL transmission may be included in the COT obtained by the terminal in a channel access for the SUL. In this case, the terminal may determine the channel access type for the AUL transmission according to whether the resource for the AUL transmission is included in the COT obtained by the base station. In more detail, the terminal may perform the AUL transmission without LBT on a resource included in a COT obtained by the base station in the resource for the AUL transmission. In another specific embodiment, the terminal may perform AUL transmission using a second type channel access on a resource included in a COT obtained by the base station in the resource for the AUL transmission. In this case, the duration of the single time interval of the second type channel access may be 25 us. Also, in a resource not included in the COT obtained by the base station in the resource for the AUL transmission, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

In another specific embodiment regardless of whether the resource for the AUL transmission are included in the COT obtained by the base station, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

All of the resource for the AUL transmission may not be included in the COT obtained by the terminal in channel access for the SUL. In this case, the terminal may perform the AUL transmission without LBT. In another specific embodiment, the terminal may perform the AUL transmission using the second type channel access. In this case, the duration of the single time interval of the second type channel access may be 25 us. This is because the terminal is allowed to perform consecutive UL transmissions through one channel access. In another specific embodiment, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

As described above, the base station may configure a interval in which UL transmission may occur from the terminal using the control channel. In more detail, the base station may configure a UL interval for UL transmission by indicating a UL duration and a UL offset by using a control channel. In the UL interval, both the resource for the SUL transmission corresponding to the UL interval and the resource for the AUL transmission after the resource for corresponding SUL transmission may be included in the COT obtained by the base station. When the resource for the SUL transmission is included in the COT obtained by the base station, the terminal may perform SUL transmission without the LBT operation. In another specific embodiment, when a resource for the SUL transmission is included in a COT obtained by the base station, the terminal may perform the SUL transmission using the second type channel access. In this case, the duration of the single time interval of the second type channel access may be 25 us.

In addition, when a resource for the AUL transmission is included in the COT obtained by the base station, the terminal may perform the AUL transmission without the LBT operation. When a resource for the AUL transmission is included in a COT obtained by the base station, the terminal may perform the AUL transmission using the second type channel access. In this case, the duration of the single time interval of the second type channel access may be 25 us. In another specific embodiment, the terminal may perform the AUL transmission using the first type channel access regardless of whether a resource for the AUL transmission is included in the COT obtained by the base station. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

The resource for the SUL transmission corresponding to the UL interval is included in the UL interval indicated through the control channel, but only some of the resource for the AUL transmission after the resource for the corresponding SUL transmission may be included in the UL interval. When the resource for the SUL transmission is included in the COT obtained by the base station, the terminal may perform the SUL transmission without the LBT operation. In another specific embodiment, when a resource for the SUL transmission is included in a COT obtained by the base station, the terminal may perform the SUL transmission using the second type channel access. In this case, the duration of the single time interval of the second type channel access may be 25 us. Furthermore, the terminal may determine the channel access type for the AUL transmission according to whether the resource for the AUL transmission is included in the COT obtained by the base station. In more detail, the terminal may perform the AUL transmission without LBT on a resource included in the COT obtained by the base station in the resource for the AUL transmission. In another specific embodiment, the terminal may perform the AUL transmission using the second type channel access on a resource included in the COT obtained by the base station in the resource for the AUL transmission. In this case, the duration of the single time interval of the second type channel access may be 25 us. Also, in a resource not included in the COT obtained by the base station in the resources for the AUL transmission, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

In another specific embodiment regardless of whether the resource for the AUL transmission is included in the COT obtained by the base station, the terminal may perform AUL transmission using the first type channel access in the UL interval. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of the AUL transmission, the channel access priority class to be used for channel access is not indicated by the UL grant.

The resource for the SUL transmission corresponding to the UL interval is included in the UL interval indicated through the control channel, but the resource for the AUL transmission after the resource for the corresponding SUL transmission may not be included in the UL interval. In this case, the terminal may perform the AUL transmission without LBT. In another specific embodiment, the terminal may perform the AUL transmission using the second type channel access. In this case, the duration of the single time interval of the second type channel access may be 25 us. This is because the terminal is allowed to perform consecutive UL transmissions through one channel access. In another specific embodiment, the terminal may perform the AUL transmission using the first type channel access. This is because the AUL transmission of the terminal is not performed based on the UL grant received from the base station, so it is necessary to consider the fairness with other wireless communication devices. In this case, the terminal may select a channel access priority class according to the type of traffic to be transmitted by the terminal. This is because, in the case of AUL transmission, the channel access priority class to be used for channel access is not indicated by the UL grant.

In addition, the power that the terminal can use for UL transmission may be limited. Thus, when a terminal aggregates and transmits a plurality of carriers, the terminal may drop transmissions using any one carrier due to limited power. This will be described with reference to FIG. 20.

Figure 20:
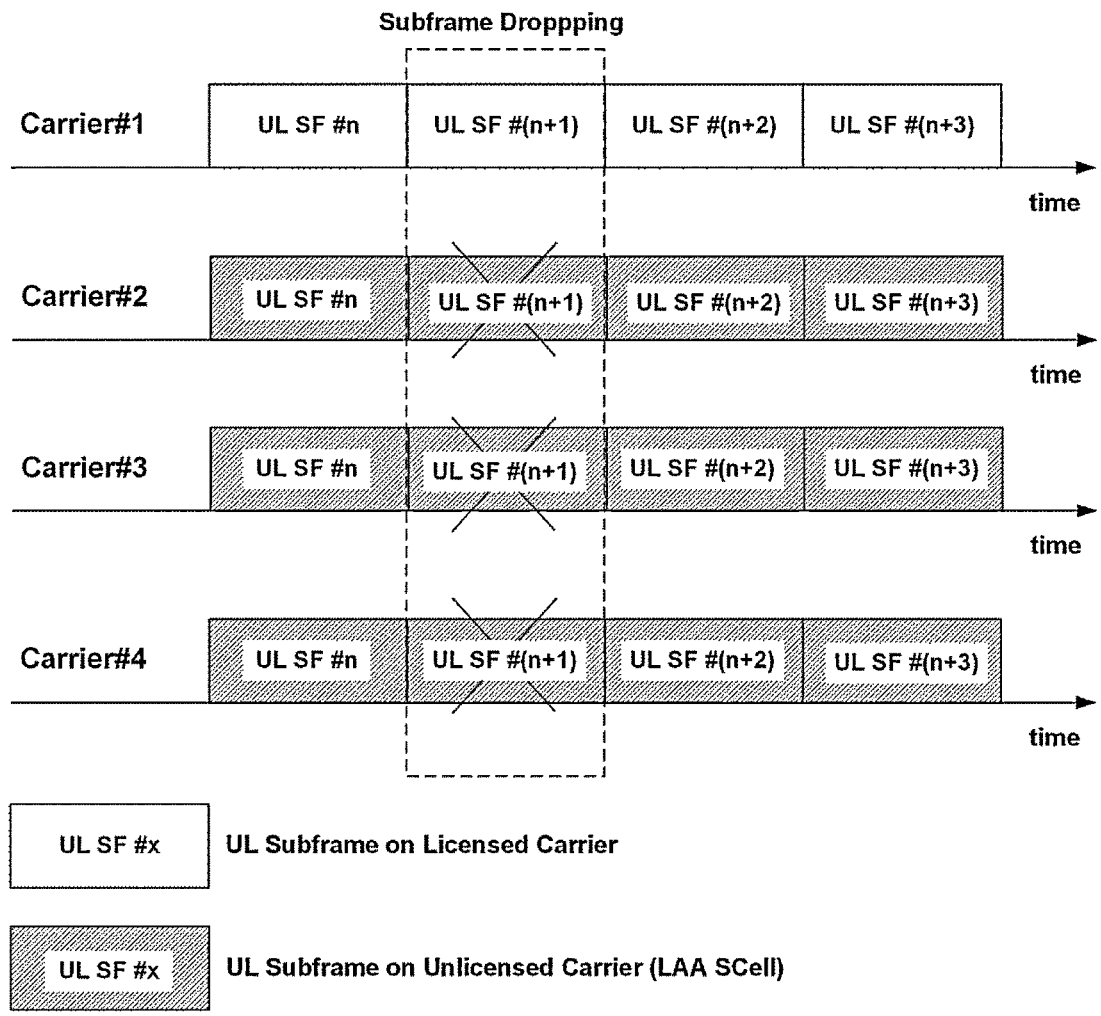
FIG. 20 shows that a terminal drops UL transmission in an unlicensed band due to power limitation when the terminal performs UL transmission by aggregating a plurality of carriers in a licensed band and a plurality of carriers in an unlicensed band according to an embodiment of the present invention.

FIG. 20 shows that a terminal drops UL transmission in an unlicensed band due to power limitation when the terminal performs UL transmission by aggregating a plurality of carriers in a licensed band and a plurality of carriers in an unlicensed band according to an embodiment of the present invention.

The terminal may perform UL transmission by aggregating at least one carrier of the licensed band and the unlicensed band. In this case, a case may occur in which the terminal does not have sufficient power to aggregate carriers in a licensed band and carriers in an unlicensed band to perform transmission. Therefore, even if the terminal succeeds in channel access in the unlicensed band, the terminal may drop a scheduled UL transmission or a transmission configured to perform transmission on the UL on the carrier of the unlicensed band according to the priority of the carrier. In the embodiment of FIG. 20, the terminal performs UL transmission by aggregating the first carrier Carrier #1 of the licensed band and the second carrier Carrier #2, the third carrier Carrier #3 and the fourth carrier Carrier #4 of the unlicensed band. However, due to power limitation, the terminal drops UL transmission using the second carrier Carrier #2, the third carrier Carrier #3, and the fourth carrier Carrier #4 of the unlicensed band in the (n+1)-th subframe. In addition, although the terminal succeeds in channel access in the unlicensed band, it may not be able to perform UL transmission in the unlicensed band due to power limitation. In this case, the channel access method of the terminal may be a problem.

The terminal may perform UL transmission based on the UL grant received from the base station. In this case, the UL grant may indicate at least one of a transmission start time point and an end time point of transmission of the terminal. In addition, when the terminal is configured to at least two time points at which the transmission can be started, and the channel fails to access so that the transmission cannot be started at the first start time point, the terminal may receive an indication that the transmission may start at the second start time point from the base station when the channel access is successful before the second start time point. According to a specific embodiment, the UL grant may indicate to start the UL transmission at one of a predetermined time point in the UL subframe that is not the boundary of the UL subframe or the boundary of the UL subframe according to the channel access result of the terminal. As one example, one of a predetermined time point in a UL subframe that is not a boundary of an UL subframe may be a start time point of a second slot of the corresponding subframe. This UL transmission mode is called a first mode Mode-1. In addition, the UL grant may indicate the start time point of the second slot of the UL subframe as the start time point of the UL transmission. This UL transmission mode is called a second mode Mode-2. In addition, the UL grant may indicate that the UL transmission is terminated at a predetermined time point, not the boundary of the UL subframe. This UL transmission mode is called a third mode Mode-3. In this case, the predetermined time point may include at least one of the fourth and seventh symbols of the subframe. In such embodiments, if the UL grant indicates UL transmission including a partial subframe and the terminal fails to start UL transmission in the unlicensed band due to power limitation even though the terminal succeeds in channel access, the channel access method of the terminal may be a problem.

For example, the UL grant may indicate the first mode described above, and the UL grant may indicate the UL transmission start time point with any of [symbol #0, symbol #0+25 us, symbol #0+25 us+TA, symbol #1]. In this case, symbol #n represents the (n+1)-th symbol in the subframe. The terminal may start the UL transmission in any one of [symbol #0, symbol #0+25 us, symbol #0+25 us+TA, symbol #1] starting from the UL subframe boundary according to the UL channel access result based on the value indicated by the UL grant. Alternatively, when the UL grant indicates the first mode and the terminal does not succeed in the LBT before the UL transmission start time point, the terminal may continue to perform the LBT so that the UL transmission can be started from the second slot of the UL subframe. In this case, when the terminal succeeds in LBT before the start of the second slot, UL transmission may start from the second slot of the UL subframe. In addition, TA indicates timing advance. In addition, when the UL grant indicates the second mode, the UL grant may indicate that the terminal starts UL transmission according to the channel access result of the terminal in any one of [symbol #7, between symbol #7 and symbol #8], that is, [symbol #7, symbol #7+25 us, symbol #7+25 us+TA, symbol #8]. Further, regardless of the first mode, second mode, and third mode for UL transmission, according to the channel access result of terminal, the UL grant may indicate to start the UL transmission at any one of symbol #7, symbol #7+25 us, symbol #7+25 us+TA, and symbol #8 as the UL start time point. Even if the terminal succeeds in channel access before any one of the plurality of transmission start time points indicated by the first mode, it may not be able to perform transmissions in the unlicensed band due to power limitations. At this time, it is a problem whether the terminal can attempt channel access at the remaining transmission start time point of the corresponding subframe. In addition, when the terminal attempts UL transmission in a subframe after the corresponding subframe, a specific channel access method of the terminal may be problematic. This will be described with reference to FIGS. 21 to 24.

Figure 21:
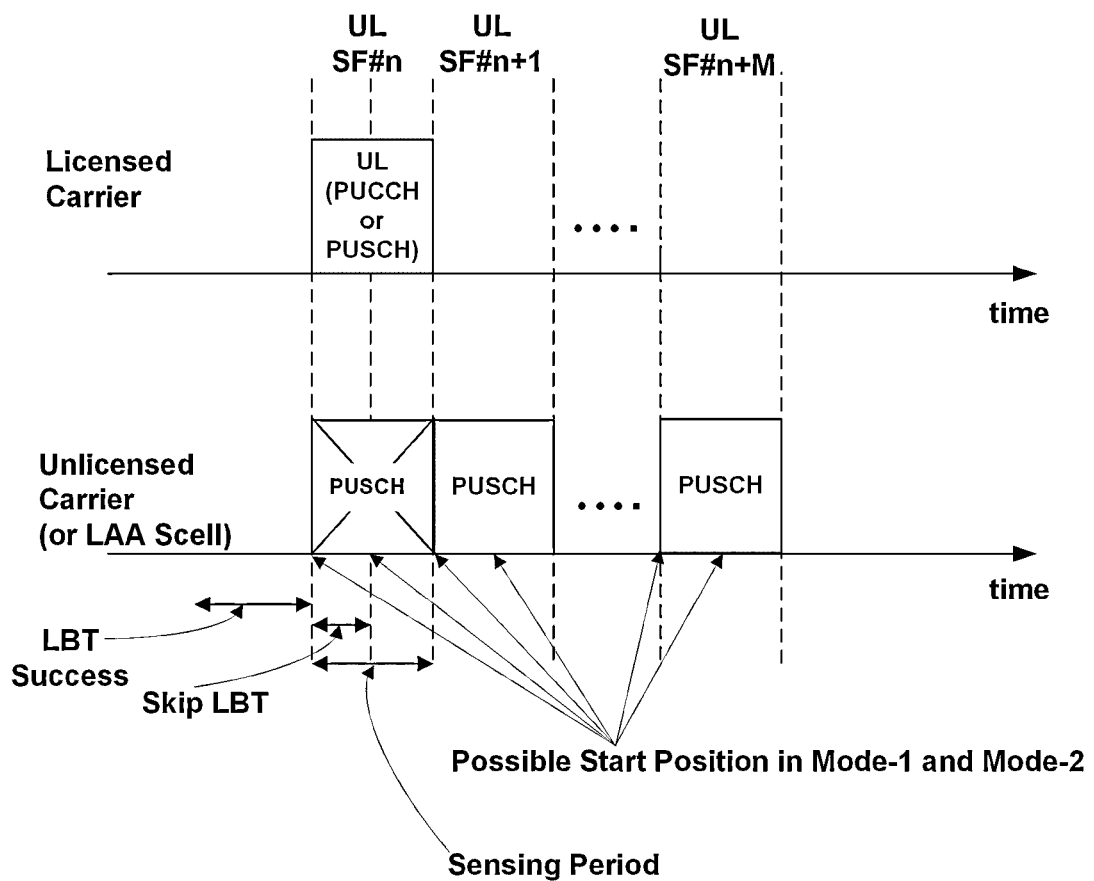
FIG. 21 illustrates an operation of a terminal attempting to access a channel again after dropping transmission in an unlicensed band due to power limitation according to an embodiment of the present invention.

FIG. 21 illustrates an operation of attempting to access a channel again after dropping a transmission in an unlicensed band at a UL transmission start time point after a terminal successfully accesses a channel according to an embodiment of the present invention. As one example of dropping transmission in the unlicensed band at the UL transmission start time point after successful channel access, the terminal may prioritize transmission in the licensed band due to power limitation and may neglect transmission in the unlicensed band.

When the terminal drops the UL transmission in the unlicensed band due to power limitation, the terminal may drop the UL transmission on a subframe basis. In more detail, the terminal may attempt UL transmission again from the next subframe of the subframe that drops the UL transmission. According to a specific embodiment, when the terminal drops UL transmission in the n-th subframe of one carrier, the terminal may attempt UL transmission from the (n+1)-th subframe of the carrier. In this case, even if there is a time point that can start the UL transmission in the n-th subframe after the time point that drops the UL transmission, the terminal may attempt UL transmission from the (n+1)-th subframe. In addition, the terminal may skip channel access for a transmission start time point configured to allow UL transmission in a subframe in which UL transmission is dropped. For example, when the UL grant indicates the first mode and also indicates to start transmission at any one of symbol #0, symbol #0+25 us, symbol #0+25 us+TA, and symbol #1 as the start time point of the UL transmission, the terminal succeeds in channel access in any one of symbol #0, symbol #0+25 us, symbol #0+25 us+TA, and symbol # of the n-th subframe, but may drop UL transmission due to lack of power of the terminal. In this case, the terminal may attempt UL transmission in the (n+1)-th subframe without attempting UL transmission in symbol #7 of the n-th subframe according to the first mode indicated by the UL grant. In addition, the terminal may skip channel access for starting transmission in symbol #7.

In these embodiments, if the terminal does not perform UL transmission even when the first type channel access is successful, the terminal may use the value of a parameter related the channel access used in the first type channel access in the next first type channel access attempt. In this case, the parameter related the channel access may include a CWS. Specifically, the terminal may reuse the value of the CWS used by the terminal in the first type channel access in the next first type channel access attempt.

In addition, when a channel accessed by the terminal is idle until the terminal attempts the next UL transmission after the terminal successfully attempts the first type channel access, the terminal may attempt UL transmission by performing a second type channel access on the channel. In addition, when a channel accessed by the terminal is not idle until the terminal attempts the next UL transmission after the terminal successfully attempts the first type channel access, the terminal may attempt UL transmission by performing a first type channel access. In this case, the terminal may perform the first type channel access using the parameter related the channel access, indicated by the UL grant. The parameter related the channel access may include a channel access priority class. For example, in the n-th subframe, the terminal succeeds in the first type channel access but may drop UL transmission due to power limitation of the terminal. In this case, when the channel is idle from when the terminal succeeds in the first type channel access until the terminal attempts UL transmission in the (n+1)-th subframe, the terminal may attempt UL transmission by performing the second type channel access in the (n+1)-th subframe. When the channel is not idle from when the terminal succeeds in the first type channel access until the terminal attempts UL transmission in the (n+1)-th subframe, the terminal may attempt UL transmission by performing the first type channel access in the (n+1)-th subframe. In the above-described embodiments, the terminal may determine whether the corresponding channel is continuously idle through channel sensing.

In the embodiment of FIG. 21, the terminal succeeds in channel access using the first type channel access so that it may perform UL transmission at the start time point of the n-th subframe UL SF #n. However, due to the power shortage of the terminal, the UL transmission is dropped at the start time point of the n-th subframe UL SF #n. In this case, the terminal may start transmission of the UL from the (n+1)-th subframe UL SF #n+1 by dropping the transmission in subframe units. Since the terminal cannot start transmission in the n-th subframe UL SF #n, even if the UL grant indicates the first mode, the terminal may skip channel access for starting transmission at the second slot start time point of the n-th subframe UL SF #n. In addition, when the corresponding channel is idle until the next UL transmission from the start time point of the n-th subframe UL SF #n, the terminal may attempt the second type channel access before the start of the next UL transmission.

Figure 22:
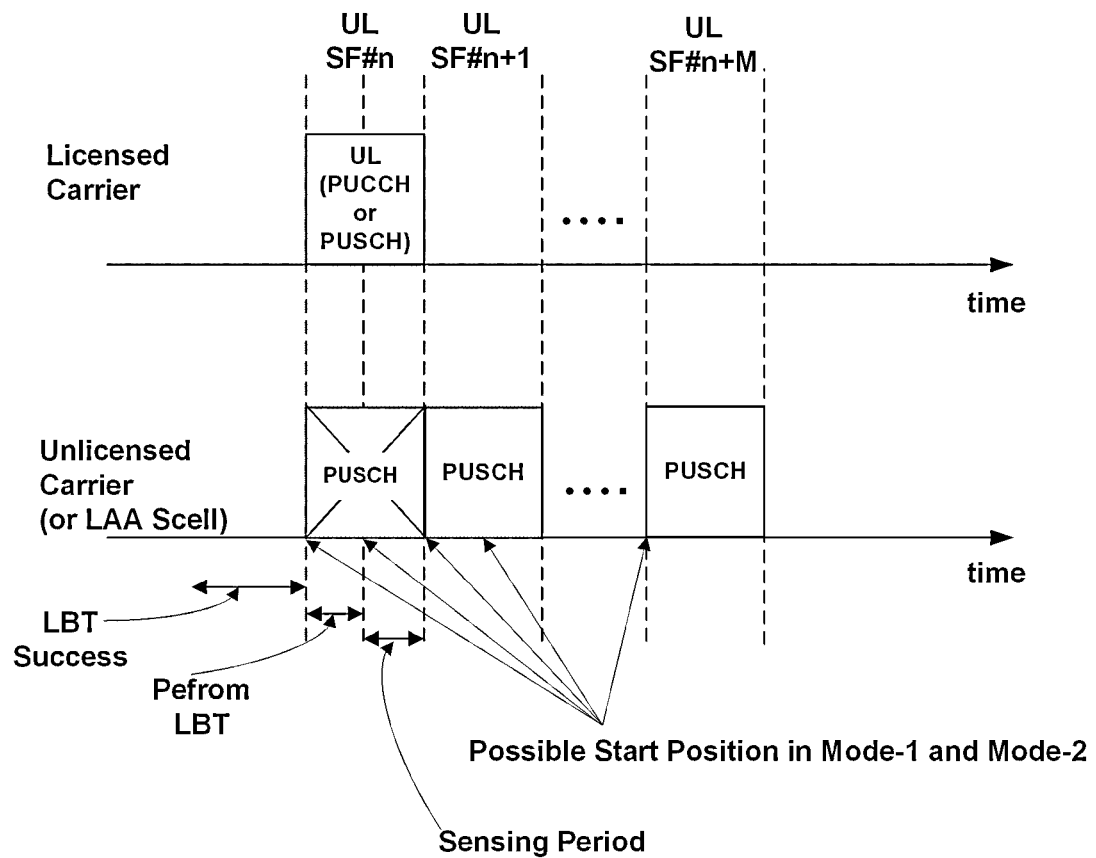
FIG. 22 illustrates an operation of a terminal attempting to access a channel again after dropping transmission in an unlicensed band due to power limitation according to another embodiment of the present invention.

FIG. 22 illustrates an operation of attempting to access a channel again after dropping a transmission in an unlicensed band at a UL transmission start time point after successfully accessing a channel according to another embodiment of the present invention. As one example of dropping transmission in the unlicensed band at the UL transmission start time point after successful channel access, the terminal may prioritize transmission in the licensed band due to power limitation and may neglect transmission in the unlicensed band.

In the embodiment described with reference to FIG. 21, when the terminal cannot start transmission in a specific subframe due to a UL transmission drop, the terminal may skip channel access for starting transmission at a start time point in the corresponding subframe. In another specific embodiment, even if the terminal cannot start transmission in a specific subframe due to the UL transmission drop, the terminal may attempt channel access regardless of whether the UL transmission can be started.

In the embodiment of FIG. 22, the terminal succeeds in channel access using the first type channel access so that it may perform UL transmission at the start time point of the n-th subframe UL SF #n. However, due to the power shortage of the terminal, the UL transmission is dropped at the start time point of the n-th subframe UL SF #n. In this case, the terminal may start transmission of the UL from the (n+1)-th subframe UL SF #n+1 by dropping the transmission in a subframe level. Even if the terminal cannot start transmission in the n-th subframe UL SF #n, when the UL grant indicates the first mode, the terminal may attempt channel access for starting transmission at the second slot start time point of the n-th subframe UL SF #n. Other operations of the terminal may be applied to the embodiments described with reference to FIG. 21.

Figure 23:
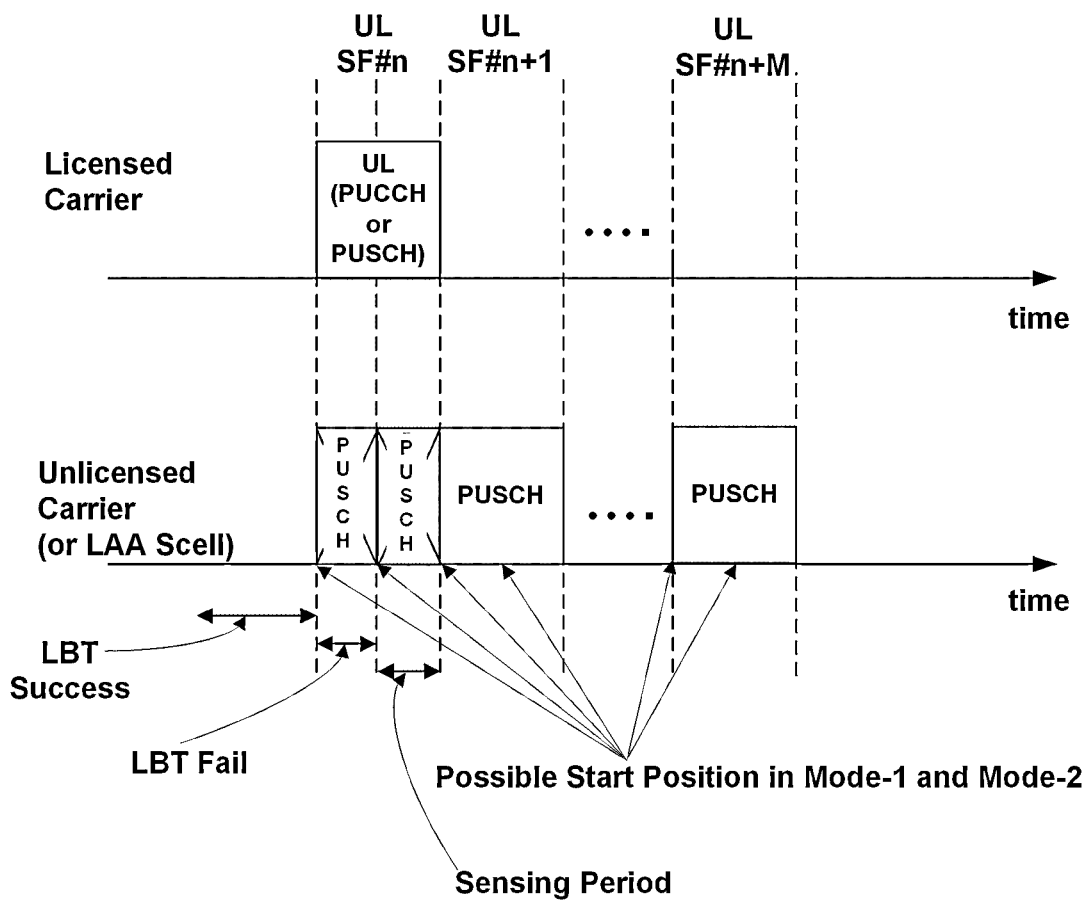
FIGS. 23 and 24 illustrate an operation of attempting to access a channel again after dropping a transmission in an unlicensed band at a UL transmission start time point after a terminal successfully accesses a channel according to another embodiment of the present invention.
Figure 24:
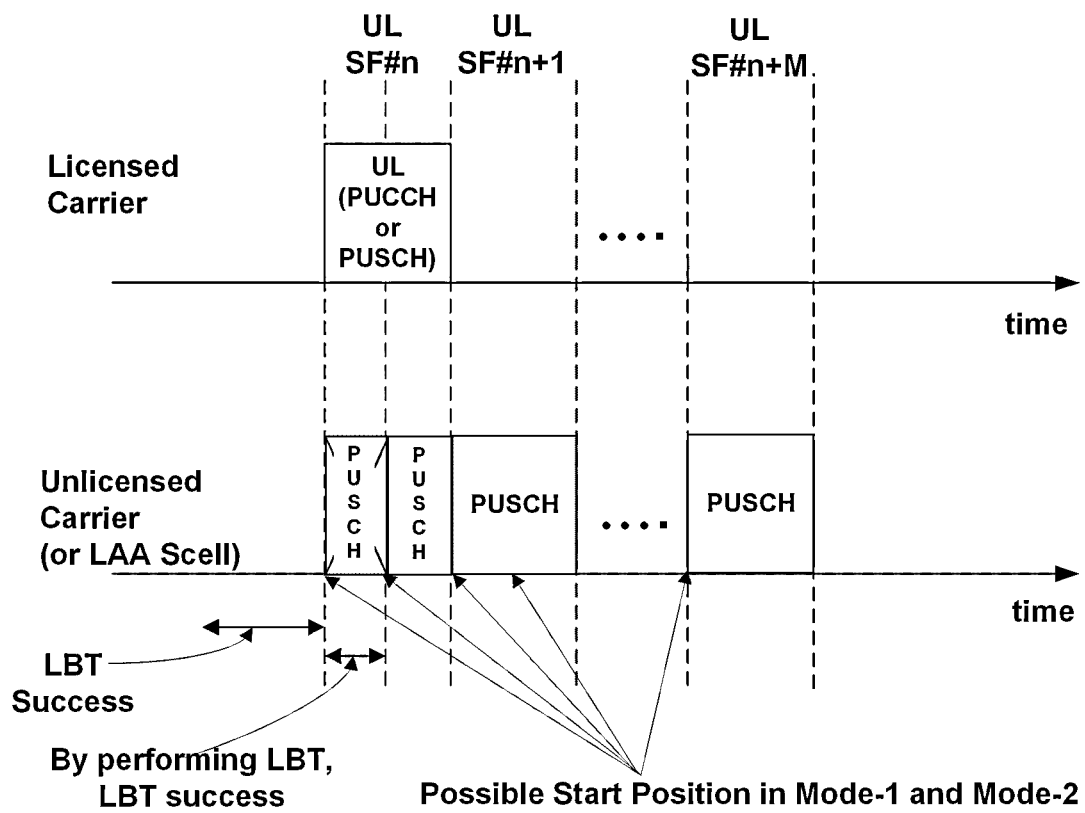

FIGS. 23 and 24 illustrate an operation of attempting to access a channel again after dropping a transmission in an unlicensed band at a UL transmission start time point after a terminal successfully accesses a channel according to another embodiment of the present invention. As one example of dropping transmission in the unlicensed band at the UL transmission start time point after successful channel access, the terminal may prioritize transmission in the licensed band due to power limitation and may neglect transmission in the unlicensed band.

FIGS. 21 to 22 illustrate an embodiment in which the terminal drops UL transmission for each subframe. In another specific embodiment, the terminal may drop the UL transmission for each slot. In the embodiment of FIGS. 23 and 24, the terminal succeeds in channel access using the first type channel access so that it may perform UL transmission at the start time point of the n-th subframe UL SF #n. However, due to the power shortage of the terminal, the UL transmission is dropped at the start time point of the n-th subframe UL SF #n. In this case, the terminal may drop UL transmission for each slot to start UL transmission from the second slot of the n-th subframe UL SF #n. Therefore, when the UL grant indicates the second mode, the terminal may attempt channel access to start transmission at the second slot start time point of the n-th subframe UL SF #n.

In the embodiment of FIG. 23, the terminal fails to access a channel for starting transmission at a second slot start point of an n-th subframe UL SF #n. According to the embodiment described with reference to FIG. 21, the terminal performs the first type channel access when attempting channel access again. In addition, since the channel access fails, the terminal may use the value of the channel access related parameter used in the first type channel access in the next first type channel access attempt. In this case, the channel access related parameter may include a CWS. Specifically, the terminal may reuse the value of the CWS used by the terminal in the first type channel access in the next first type channel access attempt.

In the embodiment of FIG. 24, the terminal succeeds in channel access for starting transmission at a second slot start time point of an n-th subframe UL SF #n. Also, since channel access is successful, the terminal may update the value of the channel access related parameter used in the first type channel access using the n-th subframe UL SF #n as a reference and use it in the next first type channel access attempt. In this case, the channel access related parameter may include a CWS. In more detail, the terminal may use a partial subframe starting from the second slot of the n-th subframe UL SF #n as a reference subframe for updating a value of the CWS.

While describing the embodiment of FIGS. 21 to 24, it has been described that the terminal can be applied to UL transmission performed based on the UL grant. Embodiments described with reference to FIGS. 21 to 24 may be applied to the AUL transmission as well as the SUL transmission.

Figure 25:
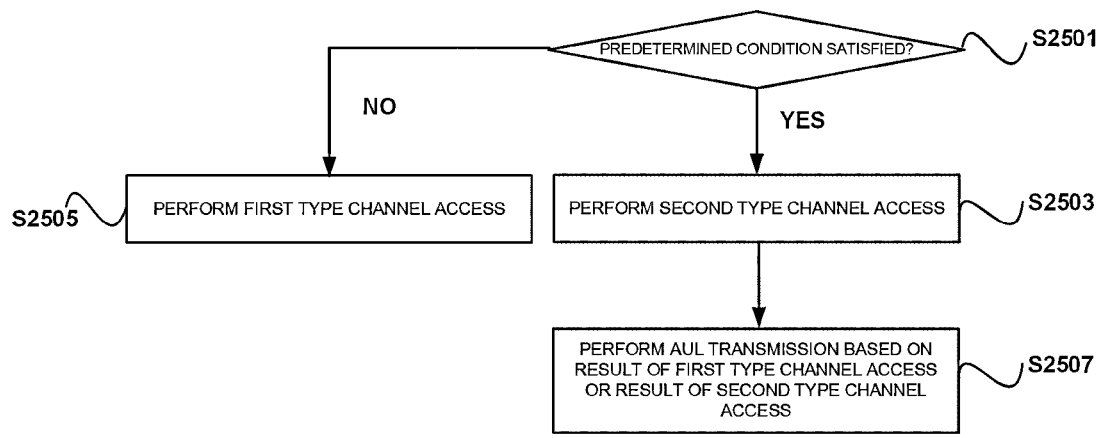
FIG. 25 is a flowchart illustrating an operation of a terminal according to an embodiment of the present invention.

FIG. 25 is a flowchart illustrating an operation of a terminal according to an embodiment of the present invention.

When the predetermined condition is not satisfied, the terminal performs a first type channel access, which is a channel access based on a random backoff, for AUL transmission (S2501 and S2505). In addition, if a predetermined condition is satisfied, the terminal performs a second type channel access, in which channel sensing during a predetermined single time interval without backoff for AUL transmission. The AUL transmission may be an UL transmission performed by the terminal without a UL grant received from the base station as described above. In this case, the predetermined condition may include that a resource for the AUL transmission is included in a COT obtained by the base station in a carrier on which the AUL transmission is performed. Specifically, the predetermined condition may include that the resource for the AUL transmission is included in the UL interval indicated by the base station using the UL offset and the UL duration in the carrier on which the AUL transmission is performed, and the resource for the AUL transmission is included in the COT obtained by the base station. Also, the terminal may determine whether the resource for the AUL transmission based on the C-PDDCH are included in a COT obtained by the base station in a carrier on which the AUL transmission is performed and whether the terminal can perform the AUL transmission on the resource for the AUL transmission included in the corresponding COT. Specific embodiments related to a predetermined condition may include the embodiments described with reference to FIGS. 18 to 19.

When the terminal performs the SUL transmission in the UL interval indicated by the base station using the UL offset and the UL duration, the terminal may perform UL transmission based on the UL grant using the second type channel access. The SUL transmission may be UL transmission performed by the terminal according to the scheduling indicated by the UL grant received from the base station as described above. The C-PDCCH may be scrambled with a group common Radio Network Temporary Identity (RNTI) to transmit UL scheduling information or downlink (DL) scheduling information to one or more terminals.

When the terminal performs the AUL transmission using the first type channel access before the n-th subframe in any one carrier, the terminal may perform the SUL transmission without the LBT procedure in the n-th subframe of any one carrier. In more detail, the terminal may perform the SUL transmission without the LBT procedure based on whether a resource for the SUL transmission is included in the COT obtained by the terminal for the AUL transmission. In addition, the terminal may perform the SUL transmission subsequent to the AUL transmission. In a specific embodiment, the terminal may operate according to the embodiments described with reference to FIG. 18.

When the terminal performs SUL transmission using the first type channel access, the terminal may obtain an initial value of the backoff counter based on a priority class indicated by the base station. In addition, when the terminal performs the first type channel access for the AUL transmission, the processor may obtain the initial value of the backoff counter based on the highest priority value among the values of the priority class.

The terminal may activate or deactivate the AUL transmission based on the RNTI indicated to configure resources for the AUL transmission. In this case, the RNTI indicated to configure the resource for the AUL transmission may be the AUL transmission RNTI described above. The terminal may monitor the AUL transmission RNTI. Specifically, when the terminal receives the DL control channel scrambled with the AUL transmission RNTI, the terminal may activate the AUL transmission based on the RNTI. In addition, when the terminal receives the DL control channel scrambled with the AUL transmission RNTI, the terminal may configure a resource for the AUL transmission based on the RNTI. When there is no period of time resource configured by the RRC configuration or the AUL transmission RNTI overrides the period of time resource configured by the RRC configuration, the terminal may determine a time resource for the AUL transmission based on the DL control channel scrambled with the AUL transmission RNTI. Furthermore, when the terminal receives the DL control channel scrambled with the AUL transmission RNTI, the terminal may deactivate the AUL transmission based on the RNTI. In addition, when the terminal receives the DL control channel scrambled with the AUL transmission RNTI, the terminal may release a resource for the AUL transmission based on the RNTI.

The terminal performs the AUL transmission based on the result of the first type channel access or the result of the second type channel access (S2507). In addition, when the resource for the AUL transmission and the resource for scheduled UL (SUL) transmission overlap, the terminal may perform the UL grant based transmission on the corresponding resource.

Figure 26:
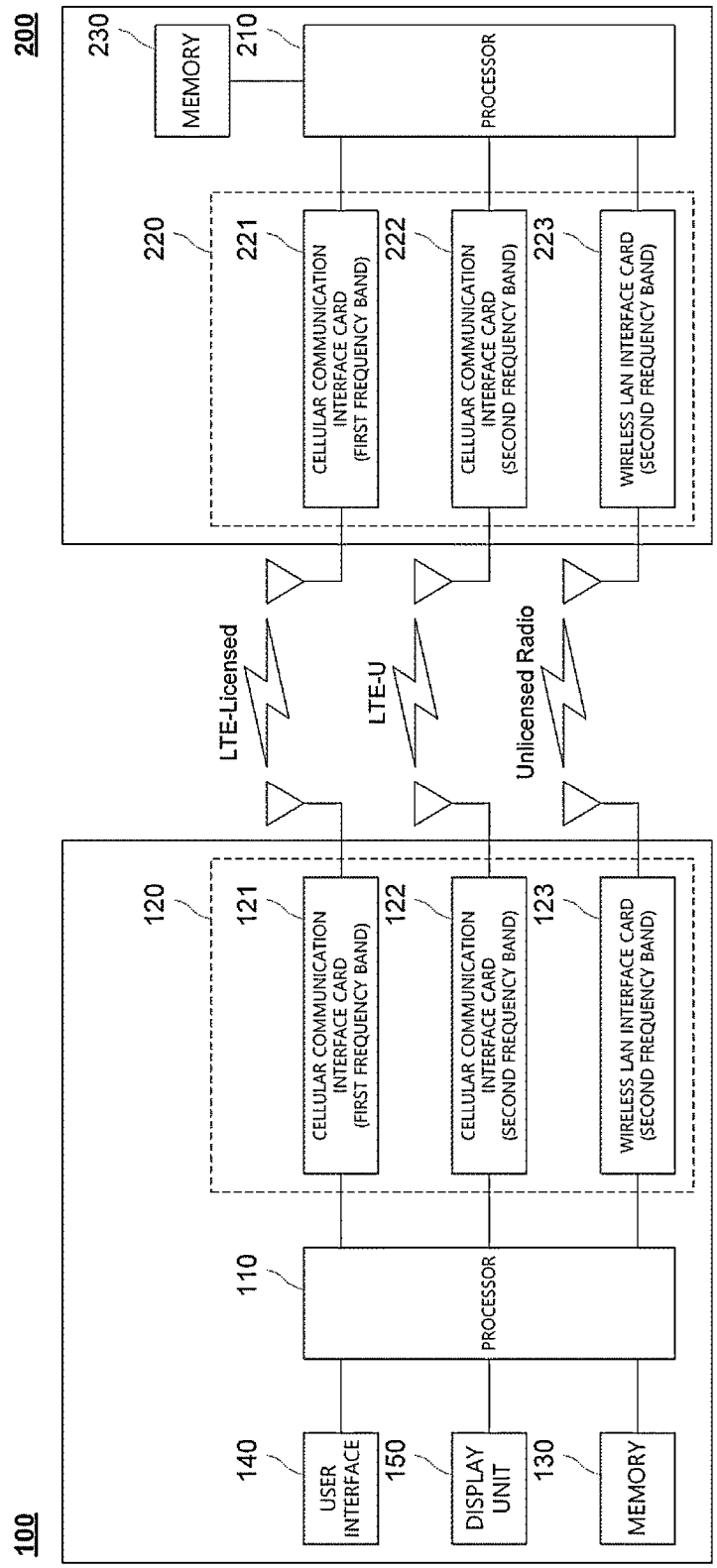
FIG. 26 shows a configuration of a user equipment and a base station according to an embodiment of the present invention.

FIG. 26 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (eg, macrocell, femtocell, picocell, etc.) corresponding to a service area and perform function such as transmitting signal, designating channel, monitoring channel, self-diagnosis, relay. The base station may be referred to as an evolved NodeB (eNB), next generation NodeB (gNB), an access point (AP), or the like.

Referring to the figure, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may receive/process the downlink signal according to the proposal of the present invention.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In the figure, the communication module 120 is illustrated as the integrated module, but the respective network interface cards may be independently disposed according to a circuit configuration or a purpose unlike the figure.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an unlicensed frequency band. For example, the unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data and control channel transmission/reception among the units. For example, the processor 210 may transmit/process the downlink transmission of data and control channel according to the proposal of the present invention. For example, the processor 210 may perform transmission of control channel and used data in the previously described embodiments.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In the figure, the communication module 220 is illustrated as the integrated module, but the respective network interface cards may be independently disposed according to the circuit configuration or the purpose unlike the figure.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the unlicensed frequency band. The unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In the figure, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A terminal of a wireless communication system, the terminal comprising:
a processor,
wherein the processor is configured to:
perform, in an unlicensed band, a first type channel access, which is a channel access based on a random backoff, for an autonomous transmission when a predetermined condition is not satisfied,
perform, in the unlicensed band, a second type channel access, in which channel sensing during a predetermined single time interval without backoff is performed, for the autonomous transmission when the predetermined condition is satisfied, and
perform, in the unlicensed band, the autonomous transmission based on a result of the first type channel access or a result of the second type channel access,
wherein the autonomous transmission on a resource configured by a radio resource control (RRC) signaling is performed by the terminal without a scheduling indicated by a grant received from another terminal.

2. The terminal of claim 1, wherein the predetermined condition comprises that the resource for the autonomous transmission in a carrier on which the autonomous transmission is performed is included in a channel occupancy time (COT) obtained by the another terminal.

3. The terminal of claim 2, wherein the predetermined condition comprises that the resource for the autonomous transmission is included in an interval indicated by the another terminal using an offset and a duration in the carrier on which the autonomous transmission is performed, and the resource for the autonomous transmission is included in the COT obtained by the another terminal.

4. The terminal of claim 3, wherein when the terminal performs, in the unlicensed band, a scheduled transmission in the interval indicated by the another terminal using the offset and the duration, the processor is configured to perform, in the unlicensed band, the scheduled transmission using the second type channel access,
wherein the scheduled transmission is performed by the terminal according to a scheduling indicated by the grant received from the another terminal.

5. The terminal of claim 2, wherein the processor is configured to determine whether the resource for the autonomous transmission is included in the COT obtained by the another terminal in the carrier on which the autonomous transmission is performed, based on a group common physical control channel,
wherein the group common physical control channel is scrambled with a group common Radio Network Temporary Identity (RNTI) for transmitting scheduling information to one or more terminals.

6. The terminal of claim 1, wherein when the terminal performs, in the unlicensed band, the autonomous transmission using the first type channel access before a n-th subframe in any one carrier, the processor is configured to perform, in the unlicensed band, a scheduled transmission in the n-th subframe of the any one carrier without a Listen Before Talk (LBT) procedure,
wherein the scheduled transmission is a transmission performed by the terminal according to the scheduling indicated by the grant received from the another terminal.

7. The terminal of claim 6, wherein the processor is configured to perform, in the unlicensed band, the scheduled transmission subsequent to the autonomous transmission.

8. The terminal of claim 6, wherein the processor is configured to perform, in the unlicensed band, the scheduled transmission without the LBT procedure based on whether a resource for the scheduled transmission is included in a channel occupancy time (COT) obtained by the terminal for the autonomous transmission.

9. The terminal of claim 1, wherein an initial value of a backoff counter in the first type channel access is determined based on a value of a priority class used in the first type channel access,
wherein when the terminal performs, in the unlicensed band, a scheduled transmission using the first type channel access, the processor is configured to obtain the initial value of the backoff counter based on a priority class indicated by the another terminal,
wherein when the terminal performs, in the unlicensed band, the first type channel access for the autonomous transmission, the processor is configured to obtain the initial value of the backoff counter based on a highest priority value among values of the priority class,
wherein the scheduled transmission is performed, in the unlicensed band, by the terminal according to a scheduling indicated by the grant received from the another terminal.

10. The terminal of claim 1, wherein the processor is configured to activate or deactivate the autonomous transmission based on a Radio Network Temporary Identity (RNTI) indicated to configure a resource for autonomous transmission.

11. The terminal of claim 1, wherein when the resource for the autonomous transmission and the resource for the scheduled transmission overlap, the processor is configured to perform, in the unlicensed band, the scheduled transmission on the corresponding resource,
  wherein the scheduled transmission is performed in the unlicensed band by the terminal according to a scheduling indicated by the grant received from the another terminal.

12. A method of operating a terminal of a wireless communication system, the method comprising:
  performing, in an unlicensed band, a first type channel access, which is a channel access based on a random backoff, for autonomous transmission when a predetermined condition is not satisfied,
  performing, in the unlicensed band, a second type channel access, in which channel sensing for a predetermined single time interval without backoff, is performed, for the autonomous transmission when the predetermined condition is satisfied, and
  performing, in the unlicensed band, the autonomous transmission based on a result of the first type channel access or a result of the second type channel access,
  wherein the autonomous transmission on a resource configured by a radio resource control (RRC) signaling is performed by the terminal without a scheduling indicated by a grant received from another terminal.

13. The method of claim 12, wherein the predetermined condition comprises that the resource for the autonomous transmission is included in a channel occupancy time (COT) obtained by the another terminal in a carrier on which the autonomous transmission is performed.

14. The method of claim 13, wherein the predetermined condition comprises that the resource for the autonomous transmission is included in an interval indicated by the another terminal using an offset and a duration in the carrier on which the autonomous transmission is performed, and the resource for the autonomous transmission is included in the COT obtained by the another terminal.

15. The method of claim 14, wherein the method further comprises, when the terminal performs, in the unlicensed band, a scheduled transmission in the interval indicated by the another terminal using the offset and the duration, performing, in the unlicensed band, the scheduled transmission using the second type channel access,
  wherein the scheduled transmission is performed by the terminal according to a scheduling indicated by the grant received from the another terminal.

16. The method of claim 13, wherein the performing of the second type channel access when the predetermined condition is satisfied comprises determining whether the resource for the autonomous transmission is included in the COT obtained by the another terminal in the carrier on which the autonomous transmission is performed, based on a group common physical control channel,
  wherein the group common physical control channel is scrambled with a group common Radio Network Temporary Identity (RNTI) for transmitting scheduling information to one or more terminals.

17. The method of claim 12, wherein the method further comprises, when the terminal performs, in the unlicensed band, the autonomous transmission using the first type channel access before a n-th subframe in any one carrier, performing, in the unlicensed band, a scheduled transmission in the n-th subframe of the any one carrier without a Listen Before Talk (LBT) procedure,
  wherein the scheduled transmission is a transmission performed by the terminal according to the scheduling indicated by the grant received from the another terminal.

18. The method of claim 17, wherein the performing of the scheduled transmission comprises performing, in the unlicensed band, the scheduled transmission subsequent to the autonomous transmission.

19. The method of claim 17, wherein the performing of the scheduled transmission comprises performing, in the unlicensed band, the scheduled transmission without the LBT procedure based on whether a resource for the scheduled transmission is included in a channel occupancy time (COT) obtained by the terminal for the autonomous transmission.

20. The method of claim 12, wherein an initial value of a backoff counter in the first type channel access is determined based on a value of a priority class used in the first type channel access,
  wherein the method further comprises, when the terminal performs, in the unlicensed band, a scheduled transmission using the first type channel access, obtaining, by the terminal, the initial value of the backoff counter based on a priority class indicated by the another terminal,
  wherein the performing of the first type channel access comprises, when the terminal performs, in the unlicensed band, the first type channel access for the autonomous transmission, obtaining the initial value of the backoff counter based on the highest priority value among values of the priority class,
  wherein the scheduled transmission is performed by the terminal according to a scheduling indicated by the grant received from the another terminal.

* * * * *